US012483158B2

(12) United States Patent
Yu et al.

(10) Patent No.: US 12,483,158 B2
(45) Date of Patent: Nov. 25, 2025

(54) POWER SUPPLY SYSTEM, INVERTER, AND METHOD FOR CONTROLLING POSITIVE AND NEGATIVE BUS VOLTAGES OF INVERTER

(71) Applicant: Huawei Digital Power Technologies Co., Ltd., Shenzhen (CN)

(72) Inventors: Xinyu Yu, Shanghai (CN); Kai Xin, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 198 days.

(21) Appl. No.: 18/474,463

(22) Filed: Sep. 26, 2023

(65) Prior Publication Data

US 2024/0022181 A1 Jan. 18, 2024

Related U.S. Application Data

(63) Continuation of application No. PCT/CN2021/084486, filed on Mar. 31, 2021.

(51) Int. Cl.
*H02M 7/483* (2007.01)
*H02J 3/38* (2006.01)
(Continued)

(52) U.S. Cl.
CPC ............... *H02M 7/483* (2013.01); *H02J 3/38* (2013.01); *H02M 1/14* (2013.01); *H02M 7/493* (2013.01); *H02J 2300/24* (2020.01)

(58) Field of Classification Search
CPC ........ H02M 7/493; H02M 7/483; H02M 1/14; H02M 1/123; H02M 1/0025; H02M 1/32; H02M 1/0074; H02J 3/38; H02J 3/381
See application file for complete search history.

(56) References Cited

U.S. PATENT DOCUMENTS

2016/0111968 A1* 4/2016 Zou ....................... H02M 5/458 363/37
2019/0393802 A1 12/2019 Gao et al.
(Continued)

FOREIGN PATENT DOCUMENTS

CN 101677220 A 3/2010
CN 104538987 A 4/2015

OTHER PUBLICATIONS

Gan et al, "Reasearch on the Circulating Current Suppression for Parallel T-type Three-level PCS based on On-line Synchronization and Average Current", 2019 IEEE 3rd Advanced Information Management, Communicates, Electronic and Automation Control Conference (IMCEC), XP033705395, Oct. 11, 2019, pp. 773-776.
(Continued)

*Primary Examiner* — Sisay G Tiku
(74) *Attorney, Agent, or Firm* — Maier & Maier, PLLC

(57) ABSTRACT

A power supply system, an inverter, and a method for controlling positive and negative bus voltages of an inverter. The power supply system includes at least one group of inverters, each group of the at least one group of inverters includes a primary inverter and at least one secondary inverter corresponding to the primary inverter, an input end of the primary inverter is coupled to a direct current power supply corresponding to the primary inverter, an input end of the secondary inverter is coupled to a direct current power supply corresponding to the secondary inverter, and a three-phase output end of the primary inverter is coupled to a three-phase output end of the secondary inverter and then is connected to an alternating current power grid.

20 Claims, 6 Drawing Sheets

Power supply system 10

(51) Int. Cl.

| | |
|---|---|
| ***H02M 1/00*** | (2007.01) |
| ***H02M 1/12*** | (2006.01) |
| ***H02M 1/14*** | (2006.01) |
| ***H02M 7/493*** | (2007.01) |

(56) References Cited

U.S. PATENT DOCUMENTS

| | | | | |
|---|---|---|---|---|
| 2020/0099313 | A1* | 3/2020 | Huang | H02M 7/5387 |
| 2023/0238896 | A1* | 7/2023 | Xu | H02M 7/53871<br>307/84 |
| 2023/0308009 | A1* | 9/2023 | Yu | H02M 1/32 |
| 2023/0318440 | A1* | 10/2023 | Yu | H02M 1/123<br>363/39 |
| 2023/0327453 | A1* | 10/2023 | Yu | H02J 3/38<br>307/82 |
| 2023/0344239 | A1* | 10/2023 | Zhang | H02J 3/381 |
| 2024/0106351 | A1* | 3/2024 | Yu | H02M 7/537 |
| 2024/0305218 | A1* | 9/2024 | Chen | H02M 1/123 |

OTHER PUBLICATIONS

Maheshwari et al., "Neutral-Point Current Modeling and Control for Neutral-Point Clamped Three-Level Converter Drive with Small DC-Link Capacitors", IEEE, XP032067438, Sep. 17, 2011, 8 pages.

Das et al., "Control of Parallel Connected Interleaved Neutral Point Clamped Inverters for Electric Vehicle Drives", IEEE, Department of Electrical and Computer Engineering, XP033860012, Oct. 18, 2020, 8 pages.

* cited by examiner

POWER SUPPLY SYSTEM, INVERTER, AND METHOD FOR CONTROLLING POSITIVE AND NEGATIVE BUS VOLTAGES OF INVERTER

CROSS-REFERENCE TO RELATED APPLICATIONS

This application is a continuation of International Application No. PCT/CN2021/084486, filed on Mar. 31, 2021, the disclosure of which is hereby incorporated by reference in its entirety.

TECHNICAL FIELD

The embodiments relate to the field of power supply technologies, a power supply system, an inverter, and a method for controlling positive and negative bus voltages of the inverter.

BACKGROUND

An inverter is a key apparatus for converting direct current into alternating current. To improve a power capacity of the inverter, a plurality of inverters may be connected in a parallel or serial-to-parallel manner for a larger power. However, after the plurality of inverters are connected in the parallel or serial-to-parallel manner, a circulating current loop may be formed. When voltage drive exists on the circulating current loop, a circulating current is formed on the circulating current loop.

As shown in FIG. 1, a power supply system of two inverters connected in parallel is used as an example. An input end of an inverter 1 is connected to a direct current power supply $DC_1$, an input end of an inverter 2 is connected to a direct current power supply $DC_2$, a negative input end of the inverter 1 is connected to a negative input end of the inverter 2, and an output end of the inverter 1 is coupled to an output end of the inverter 2 and then is connected to an alternating current power grid. When an output voltage of the $DC_1$ is inconsistent with an output voltage of the $DC_2$, there is a difference between a negative bus voltage of the inverter 1 (that is, a voltage at two ends of $C_{12}$) and a negative bus voltage of the inverter 2 (that is, a voltage at two ends of $C_{22}$), thereby generating a circulating current shown in FIG. 1. The circulating current may cause a positive bus voltage to be greater than the negative bus voltage of the inverter 1, and a positive bus voltage to be less than the negative bus voltage of the inverter 2. Consequently, adverse impact such as overcurrent protection and leakage current false protection of the inverter is generated, and normal operation of the power supply system is affected.

SUMMARY

The embodiment provides a power supply system, an inverter, and a method for controlling positive and negative bus voltages of an inverter. In this way, a circulating current may be controlled to ensure that positive and negative bus voltages of inverters in the power supply system are balanced, so that the circulating current is stable, and stability of the power supply system is improved.

According to a first aspect, the embodiment provides a power supply system, where the power supply system includes at least one group of inverters, each group of the at least one group of inverters includes a primary inverter and at least one secondary inverter corresponding to the primary inverter, an input end of the primary inverter is coupled to a direct current power supply corresponding to the primary inverter, an input end of the secondary inverter is coupled to a direct current power supply corresponding to the secondary inverter, and a three-phase output end of the primary inverter is coupled to a three-phase output end of the secondary inverter and then is connected to an alternating current power grid. The primary inverter adjusts an output common-mode direct current voltage based on a first voltage difference between a positive bus voltage of the primary inverter and a negative bus voltage of the primary inverter and an output active power. The secondary inverter adjusts an output common-mode direct current based on a second voltage difference between a positive bus voltage and a negative bus voltage. In this way, the circulating current may be controlled to ensure that positive and negative bus voltages of inverters in the power supply system are balanced, that is, a difference between a positive bus voltage and a negative bus voltage of each inverter is reduced, so that the circulating current is stable, and stability of the power supply system is improved. Because no additional device or cable is required, this can reduce system costs and has strong applicability.

With reference to the first aspect, in a first possible implementation, when the first voltage difference is greater than a first preset voltage difference threshold, and the output active power is greater than 0, the primary inverter increases the output common-mode direct current voltage, where the first preset voltage difference threshold is greater than 0; or when the first voltage difference is less than a second preset voltage difference threshold, and the output active power is greater than 0, the primary inverter reduces the output common-mode direct current voltage, where the second preset voltage difference threshold is less than 0. In this way, charging and discharging currents of a positive bus capacitor and a negative bus capacitor of the primary inverter may be adjusted by adjusting the output common-mode direct current voltage, thereby ensuring that positive and negative bus voltages of the primary inverter are balanced.

With reference to the first aspect, in a second possible implementation, when the first voltage difference is greater than a first preset voltage difference threshold, and the output active power is less than 0, the primary inverter reduces the output common-mode direct current voltage, where the first preset voltage difference threshold is greater than 0; or when the first voltage difference is less than a second preset voltage difference threshold, and the output active power is less than 0, the primary inverter increases the output common-mode direct current voltage, where the second preset voltage difference threshold is less than 0. In this way, charging and discharging currents of a positive bus capacitor and a negative bus capacitor of the primary inverter may be adjusted by adjusting the output common-mode direct current voltage, thereby ensuring that positive and negative bus voltages of the primary inverter are balanced.

With reference to the first aspect, in a third possible implementation, the primary inverter adjusts a direct current voltage in an initial reference output voltage to obtain a target reference output voltage and adjusts the output common-mode direct current voltage based on the target reference output voltage.

With reference to the first aspect, in a fourth possible implementation, when the second voltage difference is greater than a first preset voltage difference threshold, the secondary inverter reduces the output common-mode direct current, where the first preset voltage difference threshold is greater than 0; or when the second voltage difference is less than a second preset voltage difference threshold, the secondary inverter increases the output common-mode direct current, where the second preset voltage difference threshold is less than 0. In this way, the output common-mode direct current may be adjusted to adjust charging and discharging currents (that is, a direct current component of a circulating current) of a positive bus voltage and a negative bus capacitor of the secondary inverter, so as to ensure that positive and negative bus voltages of the secondary inverter are balanced.

With reference to the first aspect, in a fifth possible implementation, the secondary inverter adjusts a direct current voltage in an initial reference output voltage to obtain a target reference output voltage and adjusts the output common-mode direct current based on the target reference output voltage.

With reference to the first aspect, in a sixth possible implementation, the negative input end of the primary inverter is connected to the negative input end of the secondary inverter. The embodiments are applicable to a power supply system of a common negative direct current bus.

With reference to the first aspect, in a seventh possible implementation, the positive input end of the primary inverter is connected to the positive input end of the secondary inverter. The embodiments are applicable to a power supply system of a common positive direct current bus.

With reference to the first aspect, in an eighth possible implementation, the at least one group of inverters include a first group of inverters and a second group of inverters, a negative input end of one inverter in the first group of inverters is connected to a positive input end of one inverter in the second group of inverters, the first group of inverters include a first primary inverter and n first secondary inverters corresponding to the first primary inverter, and the second group of inverters include a second primary inverter and n second secondary inverters corresponding to the second primary inverter, where n is a positive integer, a three-phase output end of the first primary inverter is coupled to a three-phase output end of the first secondary inverter and then is connected to the alternating current power grid, and a three-phase output end of the second primary inverter is coupled to a three-phase output end of the second secondary inverter and then is connected to the alternating current power grid. The embodiments are applicable to a power supply system of a bipolar series-parallel combination.

According to a second aspect, the embodiment provides a method for controlling positive and negative bus voltages of an inverter, and the method is applicable to a power supply system. The power supply system includes at least one group of inverters, each group of the at least one group of inverters includes a primary inverter and at least one secondary inverter corresponding to the primary inverter, an input end of the primary inverter is coupled to a direct current power supply corresponding to the primary inverter, an input end of the secondary inverter is coupled to a direct current power supply corresponding to the secondary inverter, and a three-phase output end of the primary inverter is coupled to a three-phase output end of the secondary inverter and then is connected to an alternating current power grid. The primary inverter adjusts an output common-mode direct current voltage based on a first voltage difference between a positive bus voltage of the primary inverter and a negative bus voltage of the primary inverter and an output active power. The secondary inverter adjusts an output common-mode direct current based on a second voltage difference between a positive bus voltage and a negative bus voltage.

With reference to the second aspect, in a first possible implementation, when the first voltage difference is greater than a first preset voltage difference threshold, and the output active power is greater than 0, the primary inverter increases the output common-mode direct current voltage, where the first preset voltage difference threshold is greater than 0; or when the first voltage difference is less than a second preset voltage difference threshold, and the output active power is greater than 0, the primary inverter reduces the output common-mode direct current voltage, where the second preset voltage difference threshold is less than 0.

With reference to the second aspect, in a second possible implementation, when the first voltage difference is greater than a first preset voltage difference threshold, and the output active power is less than 0, the primary inverter reduces the output common-mode direct current voltage, where the first preset voltage difference threshold is greater than 0; or when the first voltage difference is less than a second preset voltage difference threshold, and the output active power is less than 0, the primary inverter increases the output common-mode direct current voltage, where the second preset voltage difference threshold is less than 0.

With reference to the second aspect, in a third possible implementation, the primary inverter adjusts a direct current voltage in an initial reference output voltage to obtain a target reference output voltage and adjusts the output common-mode direct current voltage based on the target reference output voltage.

With reference to the second aspect, in a fourth possible implementation, when the second voltage difference is greater than a first preset voltage difference threshold, the secondary inverter reduces the output common-mode direct current, where the first preset voltage difference threshold is greater than 0; or when the second voltage difference is less than a second preset voltage difference threshold, the secondary inverter increases the output common-mode direct current, where the second preset voltage difference threshold is less than 0.

With reference to the second aspect, in a fifth possible implementation, the secondary inverter adjusts a direct current voltage in an initial reference output voltage to obtain a target reference output voltage and adjusts the output common-mode direct current based on the target reference output voltage.

With reference to the second aspect, in a sixth possible implementation, the negative input end of the primary inverter is connected to the negative input end of the secondary inverter.

With reference to the second aspect, in a seventh possible implementation, the positive input end of the primary inverter is connected to the positive input end of the secondary inverter.

With reference to the second aspect, in an eighth possible implementation, the at least one group of inverters include a first group of inverters and a second group of inverters, a negative input end of one inverter in the first group of inverters is connected to a positive input end of one inverter in the second group of inverters, the first group of inverters include a first primary inverter and n first secondary inverters corresponding to the first primary inverter, and the second group of inverters include a second primary inverter and n second secondary inverters corresponding to the second primary inverter, where n is a positive integer, a three-phase output end of the first primary inverter is coupled to a three-phase output end of the first secondary inverter and then is connected to the alternating current power grid, and a three-phase output end of the second primary inverter is coupled to a three-phase output end of the second secondary inverter and then is connected to the alternating current power grid.

According to a third aspect, the embodiment provides an inverter, where an input end of the inverter is coupled to a direct current power supply, and a three-phase output end of the inverter is coupled to a three-phase output end of each of at least one secondary inverter and then is connected to an alternating current power grid. The inverter adjusts an output common-mode direct current voltage based on a voltage difference between a positive bus voltage and a negative bus voltage and an output active power.

With reference to the third aspect, in a first possible implementation, when the voltage difference is greater than a first preset voltage difference threshold, and the output active power is greater than 0, the inverter increases the output common-mode direct current voltage, where the first preset voltage difference threshold is greater than 0; or when the voltage difference is less than a second preset voltage difference threshold, and the output active power is greater than 0, the inverter reduces the output common-mode direct current voltage, where the second preset voltage difference threshold is less than 0.

With reference to the third aspect, in a second possible implementation, when the voltage difference is greater than a first preset voltage difference threshold, and the output active power is less than 0, the inverter reduces the output common-mode direct current voltage, where the first preset voltage difference threshold is greater than 0; or when the voltage difference is less than a second preset voltage difference threshold, and the output active power is less than 0, the inverter increases the output common-mode direct current voltage, where the second preset voltage difference threshold is less than 0.

With reference to the third aspect, in a second possible implementation, the inverter adjusts a direct current voltage in an initial reference output voltage to obtain a target reference output voltage and adjusts the output common-mode direct current voltage based on the target reference output voltage.

According to a fourth aspect, the embodiment provides an inverter, where an input end of the inverter is coupled to a direct current power supply, and a three-phase output end of the inverter is coupled to a three-phase output end of one primary inverter and then is connected to an alternating current power grid. The inverter adjusts an output common-mode direct current based on a voltage difference between a positive bus voltage and a negative bus voltage.

With reference to the fourth aspect, in a first possible implementation, when the voltage difference is greater than a first preset voltage difference threshold, the inverter reduces the output common-mode direct current, where the first preset voltage difference threshold is greater than 0; or when the voltage difference is less than a second preset voltage difference threshold, the inverter increases the output common-mode direct current, where the second preset voltage difference threshold is less than 0.

With reference to the fourth aspect, in a second possible implementation, the inverter adjusts a direct current voltage in an initial reference output voltage to obtain a target reference output voltage and adjusts the output common-mode direct current based on the target reference output voltage.

It should be understood that implementation and beneficial effects of the foregoing aspects may be referred to each other.

DETAILED DESCRIPTION OF THE EMBODIMENTS

For a power supply system in which a plurality of inverters may be connected in a parallel or serial-to-parallel manner, if there is a voltage difference between a positive bus voltage and a negative bus voltage of the inverters connected in parallel, a circulating current is formed among the plurality of inverters in the power supply system. Adverse impact of the circulating current includes: (1) loss increases, which affects a service life and reliability of a component or an element; (2) a current peak may cause overcurrent protection for the inverter; and (3) the circulating current is a common-mode current, which may cause a leakage current detected by the inverter to be excessively large, and result in leakage current false protection. Therefore, the circulating current may affect normal operation of the power supply system.

According to the power supply system and the method for controlling positive and negative bus voltages of an inverter, the circulating current may be controlled to ensure that positive and negative bus voltages of inverters in the power supply system are balanced, so that the circulating current is stable, and stability of the power supply system is improved. Because no additional device or cable is required, this can reduce system costs and has strong applicability.

The power supply system, the inverter, and the method for controlling positive and negative bus voltages of the inverter may be applicable to the following scenarios.

Figure 1:
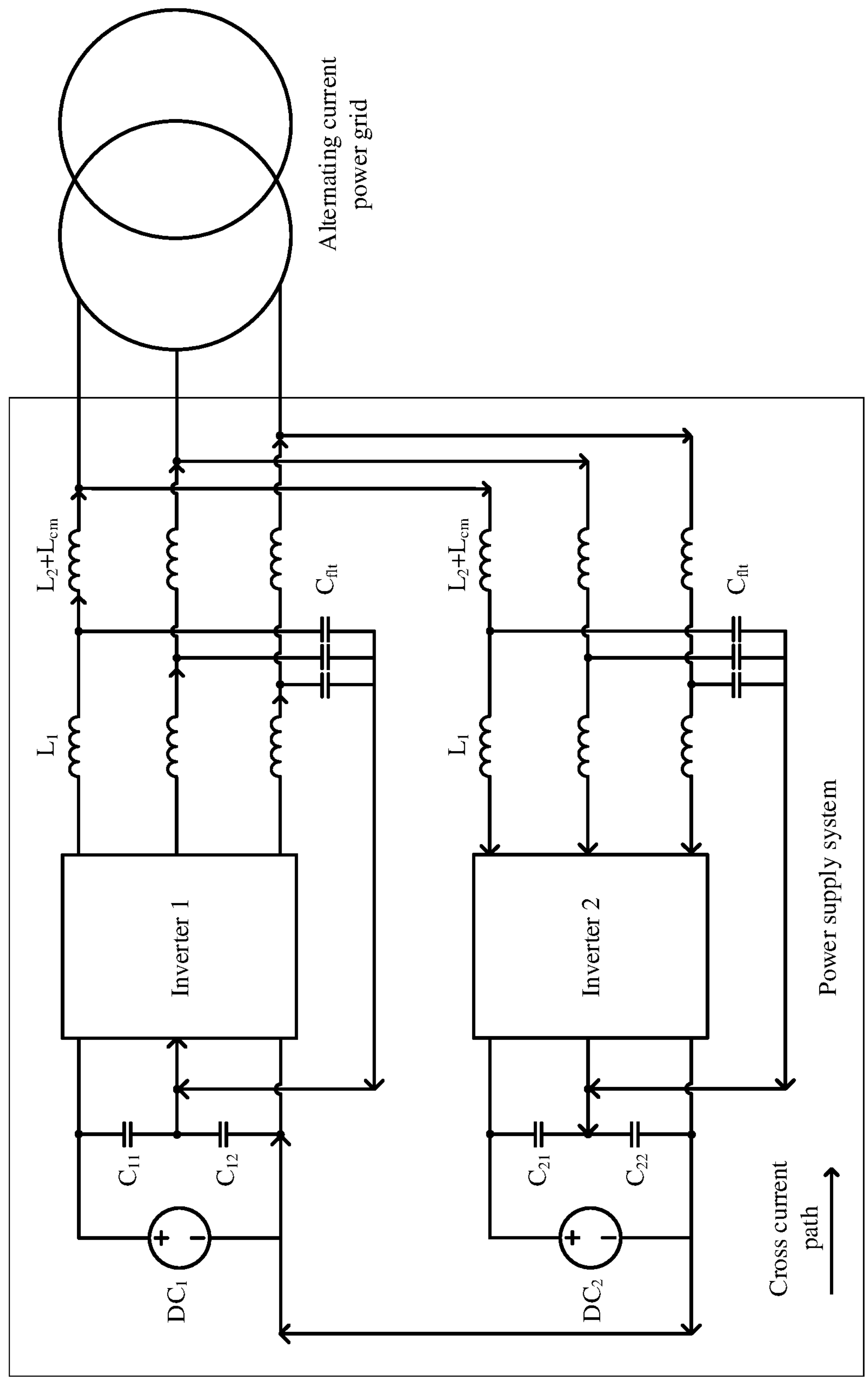
FIG. 1 is a schematic diagram of a structure of a power supply system in the conventional technology.
Figure 2:
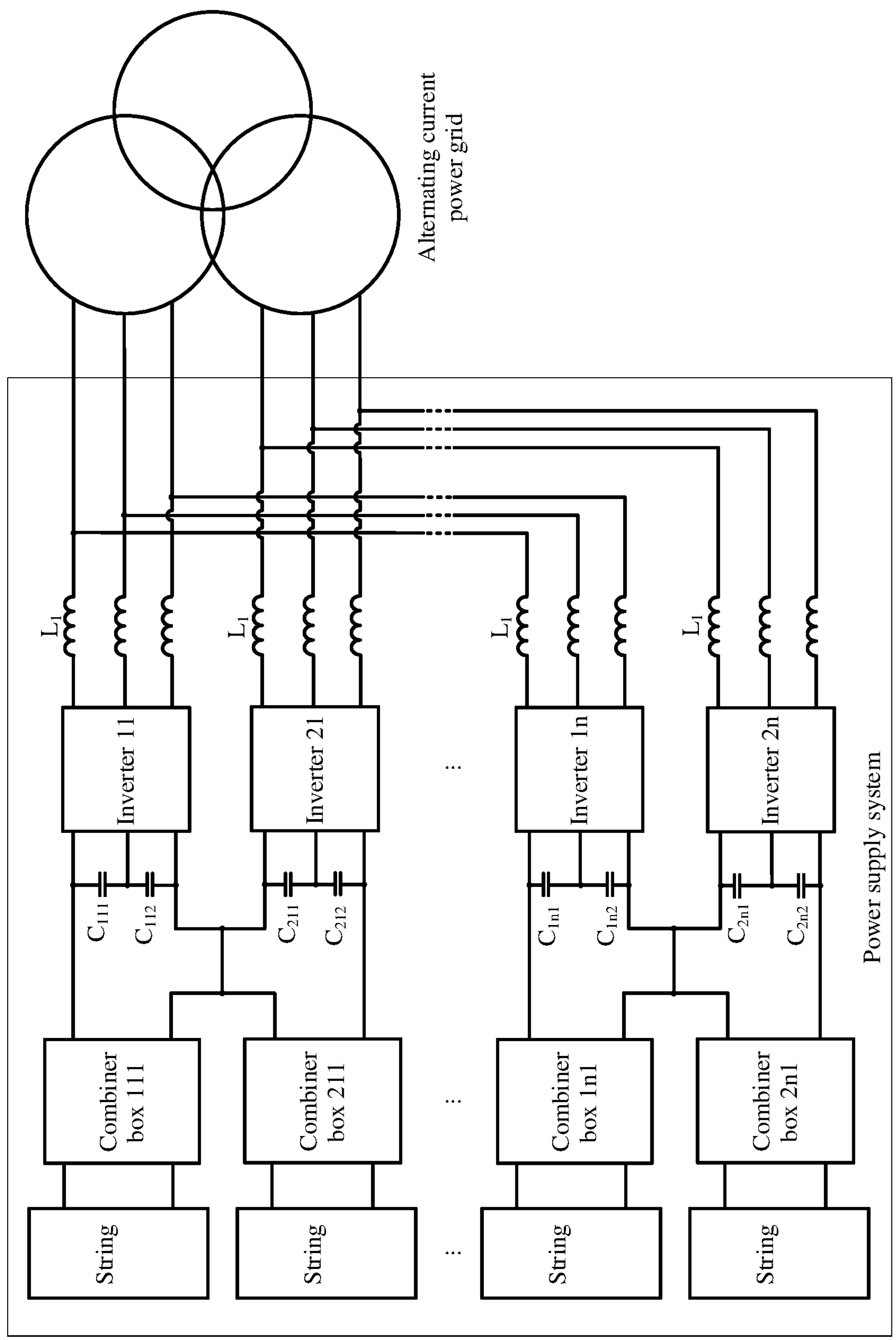
FIG. 2 is a schematic diagram of an application scenario of a power supply system.

FIG. 2 is a schematic diagram of an application scenario of a power supply system. As shown in FIG. 2, the power supply system includes a primary inverter 11, a primary inverter 21, . . . , a secondary inverter 1*n*, and a secondary inverter 2*n*. An input end of the primary inverter 11 is connected to an output end of a combiner box 111, an input end of the combiner box 111 is connected to a string, . . . , an input end of the secondary inverter 2*n* is connected to an output end of a combiner box 2*n*1, and an input end of the combiner box 2*n*1 is connected to the string. Three-phase output ends of the primary inverter 11, . . . , and the secondary inverter 1*n* are connected to each other after passing through inductors $L_1$ thereof respectively, and then are connected to an alternating current power grid; and three-phase output ends of a primary inverter 21, . . . , and the secondary inverter 2*n* are connected to each other after passing through inductors $L_1$ thereof respectively, and then are connected to the alternating current power grid.

Each combiner box in the power supply system shown in FIG. 2 is a maximum power point tracking (MPPT) combiner box and is used to perform direct current conversion on direct current generated by a photovoltaic string connected to the combiner box and output the converted direct current to an inverter connected to the combiner box. The inverter is used to convert, through inversion, the direct current generated by the combiner box into alternating current that meets requirements of a power grid. The power supply system may transmit the converted alternating current to the power grid.

An optional embodiment may be applied to a photovoltaic scenario. In this case, each string included in the power supply system may be a photovoltaic string, and each photovoltaic string may include a plurality of photovoltaic modules connected in series and/or in parallel. In an optional implementation scenario, the power supply system may be further applied to a scenario of an uninterruptible power supply, that is, an energy storage battery, for example, a nickel-cadmium battery, a nickel-hydrogen battery, a lithium-ion battery, or a lithium polymer battery, may be disposed between the inverter and the power grid.

Another optional embodiment may be applied to a photovoltaic scenario in which a plurality of devices may be connected in parallel. In this case, each string in the power supply system may be a photovoltaic string or an energy storage cell string, and each energy storage cell string may include a plurality of energy storage batteries connected in series and/or in parallel. For example, the combiner box 111 is connected to at least one photovoltaic string, and a combiner box 211 is connected to at least one energy storage cell string. In an optional implementation scenario, the power supply system may be further applied to a scenario of an uninterruptible power supply, that is, an energy storage battery, for example, a nickel-cadmium battery, a nickel-hydrogen battery, a lithium-ion battery, or a lithium polymer battery, may be disposed between the inverter and the power grid.

Still another optional embodiment may be applied to a battery charging/discharging scenario. In this case, each string included in the power supply system may be an energy storage cell string, and each energy storage cell string may include a plurality of energy storage batteries connected in series and/or in parallel. In an optional implementation scenario, the power supply system may be further applied to a scenario of an uninterruptible power supply, that is, an energy storage battery, for example, a nickel-cadmium battery, a nickel-hydrogen battery, a lithium-ion battery, or a lithium polymer battery, may be disposed between the inverter and the power grid.

In the foregoing three optional application scenarios, because manners for controlling positive and negative bus voltages of primary inverters are all the same, and manners for controlling positive and negative bus voltages of secondary inverters are all the same, the following uses the primary inverter 11 and the secondary inverter 1*n* as an example for description. The primary inverter 11 obtains a positive bus voltage (that is, a voltage at two ends of a capacitor $C_{111}$), a negative bus voltage (that is, a voltage at two ends of a capacitor $C_{112}$), and an output active power, and adjusts an output common-mode direct current voltage based on a first voltage difference between the positive bus voltage and the negative bus voltage and the output active power. The secondary inverter 1*n* obtains a positive bus voltage (that is, a voltage at two ends of a capacitor $C_{1n1}$) and a negative bus voltage (that is, a voltage at two ends of a capacitor $C_{1n2}$) and adjusts an output common-mode direct current based on a second voltage difference between the positive bus voltage and the negative bus voltage. In the foregoing positive and negative bus voltage control manner, the circulating current may be controlled to ensure that positive and negative bus voltages of inverters in the power supply system are balanced, so that the circulating current is stable, and stability of the power supply system is improved. Because no additional device or cable is required, this can reduce system costs and has strong applicability.

The foregoing is merely an example of an application scenario of the power supply system and is not exhaustive. The application scenario is not limited.

Figure 3:
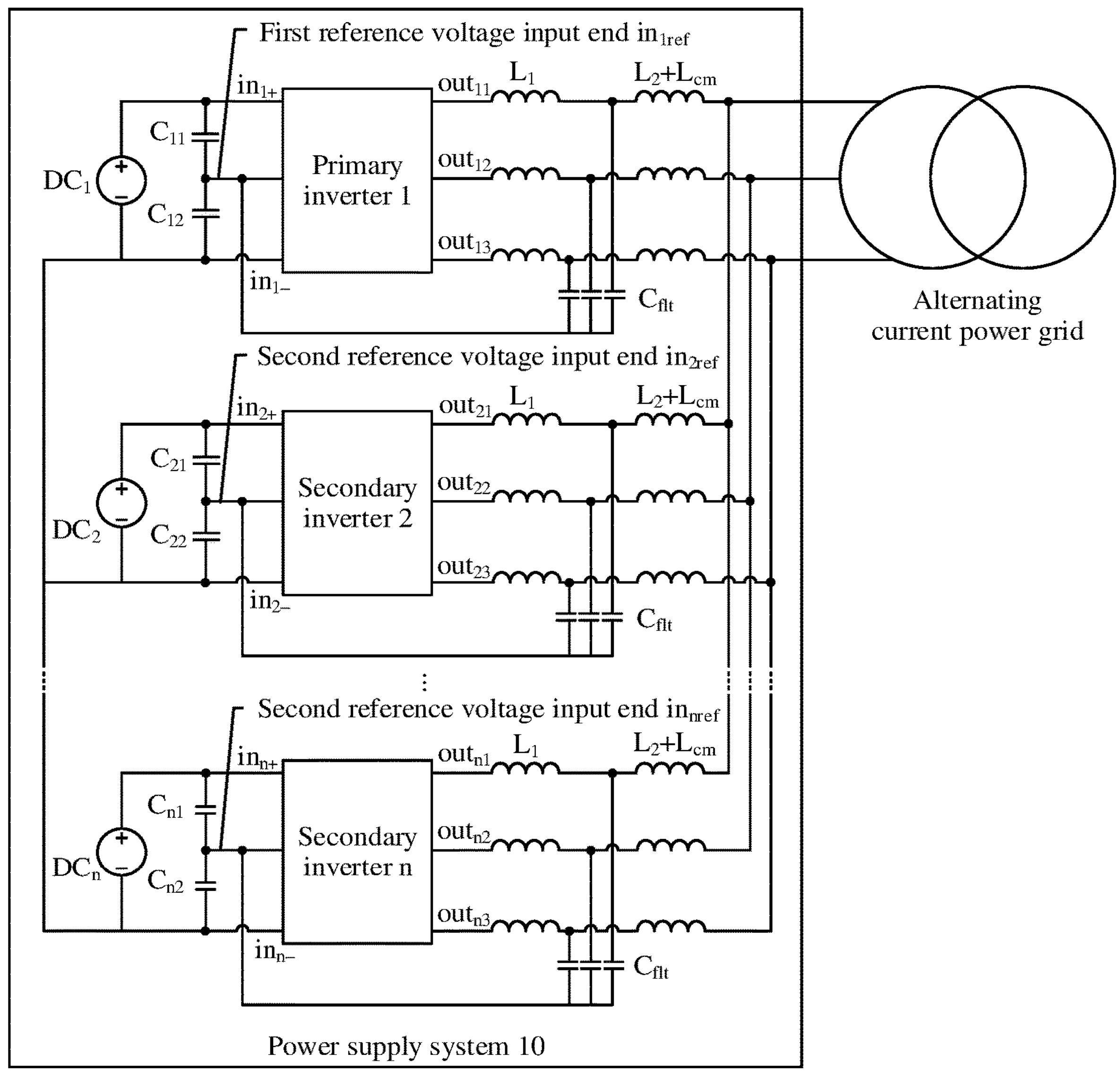
FIG. 3 is a schematic diagram of a structure of a power supply system of a common negative direct current bus.

FIG. 3 is a schematic structural diagram of a power supply system of a common negative direct current bus. As shown in FIG. 3, a power supply system 10 includes a primary inverter 1 and at least one secondary inverter (corresponding to a secondary inverter 2, . . . , and a secondary inverter n) corresponding to the primary inverter 1. A positive input end $in_{1+}$ and a negative input end $in_{1-}$ of the primary inverter 1 are connected to a direct current power supply $DC_1$, a positive input end $in_{2+}$ and a negative input end $in_{2-}$ of the secondary inverter 2 are connected to a direct current power supply $DC_2$, . . . , and a positive input end $in_{n+}$ and a negative input end $in_{n-}$ of the secondary inverter n are connected to a direct current power supply $DC_n$. The positive input end $in_{1+}$ of the primary inverter 1 is connected to the negative input end $in_{1-}$ of the primary inverter 1 after passing through a positive bus capacitor $C_{11}$ and a negative bus capacitor $C_{12}$, the positive input end $in_{2+}$ of the secondary inverter 2 is connected to the negative input end $in_{2-}$ of the secondary inverter 2 after passing through a positive bus capacitor $C_{21}$ and a negative bus capacitor $C_{22}$, . . . , and the positive input end $in_{n+}$ of the secondary inverter n is connected to the negative input end $in_{n-}$ of the secondary inverter n after passing through a positive bus capacitor $C_{n1}$ and a negative bus capacitor $C_{n2}$. The negative input end $in_{1-}$ of the primary inverter 1, the negative input end $in_{2-}$ of the secondary inverter 2, . . . , and the negative input end $in_{n-}$ of the secondary inverter n are connected to each other. Three-phase output ends $out_{11}$, $out_{12}$, and $out_{13}$ of the primary inverter 1, three-phase output ends $out_{21}$, $out_{22}$, and $out_{23}$ of the secondary inverter 2, . . . , and three-phase output ends $out_{n1}$, $out_{n2}$, and $out_{n3}$ of the secondary inverter n are connected to each other after passing through corresponding inductors $L_1$ and $L_2+L_{cm}$ thereof respectively, and then are connected to an alternating current power grid.

In an implementation, the primary inverter 1 obtains a voltage between $in_{1+}$ and a first reference voltage input end $in_{1ref}$ in real time, to obtain a positive bus voltage (that is, a voltage at two ends of $C_{11}$) of the primary inverter 1, obtains a voltage between $in_{1ref}$ and $in_{1-}$, to obtain a negative bus voltage (that is, a voltage at two ends of $C_{12}$) of the primary inverter 1, and obtains an output voltage and an output current of the primary inverter 1; the secondary inverter 2 obtains a voltage between $in_{2+}$ and a second reference voltage input end $in_{2ref}$ in real time, to obtain a positive bus voltage (that is, a voltage at two ends of $C_{21}$) of the secondary inverter 2, and obtains a voltage between $in_{2ref}$ and $in_2$, to obtain a negative bus voltage (that is, a voltage at two ends of $C_{22}$) of the secondary inverter 2; . . . ; and the secondary inverter n obtains a voltage between $in_{n+}$ and a second reference voltage input end $in_{nref}$ in real time, to obtain a positive bus voltage (that is, a voltage at two ends of $C_{n1}$) of the secondary inverter n, and obtains a voltage between $in_{nref}$ and $in_{n-}$, to obtain a negative bus voltage (that is, a voltage at two ends of $C_{n2}$) of the secondary inverter n. $in_{1ref}$, $in_{2ref}$, . . . , and $in_{nref}$ may all be understood as reference grounds. Because a potential of a positive input end of an inverter is positive, a potential of a negative input end is negative, and a potential of a reference voltage input end is 0, both a positive bus voltage and a negative bus voltage of each inverter are greater than or equal to 0.

When both a phase of the output voltage and a phase of the output current of the primary inverter 1 are $\pi N_1$, it is determined that an output active power of the primary inverter 1 is greater than 0, that is, the output active power of the primary inverter 1 flows from the primary inverter 1 to the alternating current power grid; and when both the phase of the output voltage and the phase of the output current of the primary inverter 1 are $\pi N_2$, it is determined that the output active power of the primary inverter 1 is less than 0, that is, the output active power of the primary inverter 1 flows from the alternating current power grid to the primary inverter 1. $N_1$ is a positive even number, and $N_2$ is a positive odd number.

The primary inverter 1 adjusts an output common-mode direct current voltage of the primary inverter 1 based on a first voltage difference between the positive bus voltage and the negative bus voltage and the output active power of the primary inverter 1, where the output common-mode direct current voltage is a direct current component of a common part in three-phase output voltages of the primary inverter 1, that is, a direct current component in an average value of the three-phase output voltages of the primary inverter 1.

In an optional embodiment, if the first voltage difference is greater than a first preset voltage difference threshold, and the output active power is greater than 0, it indicates that for the primary inverter 1, the positive bus voltage is greater than the negative bus voltage, and the positive bus capacitor $C_{11}$ is in a discharging state, and the negative bus capacitor $C_{12}$ is in a charging state. In this case, the primary inverter 1 increases, in a positive direction (that is, a direction from the primary inverter 1 to the alternating current power grid), or reduces, in a negative direction (that is, a direction from the alternating current power grid to the primary inverter 1), the output common-mode direct current voltage. The first preset voltage difference threshold is greater than 0.

For example, it is assumed that the first voltage difference is 1 V, the first preset voltage difference threshold is 0.5 V, and the output active power is greater than 0. In this case, the primary inverter 1 may increase the output common-mode direct current voltage by 1 V in the positive direction, that is, from 1 V to 2 V.

For another example, it is assumed that the first voltage difference is 1 V, the first preset voltage difference threshold is 0.5 V, and the output active power is greater than 0. In this case, the primary inverter 1 may reduce the output common-mode direct current voltage by 1 V in the negative direction, that is, from −2 V to −1 V.

It may be understood that, for the primary inverter 1, when the positive bus voltage is greater than the negative bus voltage, and the output active power is greater than 0, the output common-mode direct current voltage of the primary inverter 1 may be increased to increase a discharging current of the positive bus capacitor $C_{11}$ and increase a charging current of the negative bus capacitor $C_{12}$ (that is, reduce a direct current component of a circulating current), so that the positive bus voltage of the primary inverter 1 is reduced, and the negative bus voltage is increased, thereby ensuring that positive and negative bus voltages of the primary inverter 1 are balanced.

In another optional embodiment, if the first voltage difference is less than a second preset voltage difference threshold, and the output active power is greater than 0, it indicates that for the primary inverter 1, the positive bus voltage is less than the negative bus voltage, and the positive bus capacitor $C_{11}$ is in a discharging state, and the negative bus capacitor $C_{12}$ is in a charging state. In this case, the primary inverter 1 reduces, in a positive direction (that is, a direction from the primary inverter 1 to the alternating current power grid), or increases, in a negative direction (that is, a direction from the alternating current power grid to the primary inverter 1), the output common-mode direct current voltage. The second preset voltage difference threshold is less than 0.

For example, it is assumed that the first voltage difference is −1 V, the second preset voltage difference threshold is −0.5 V, the output active power is greater than 0, and when the direction from the primary inverter 1 to the alternating current power grid is the positive direction, a current output common-mode direct current voltage of the primary inverter 1 is 2 V. In this case, the primary inverter 1 reduces the current output common-mode direct current voltage by 1 V in the positive direction, that is, from 2 V to 1 V.

For another example, it is assumed that the first voltage difference is −1 V, the second preset voltage difference threshold is −0.5 V, the output active power is greater than 0, and when the direction from the alternating current power grid to the primary inverter 1 is the negative direction, the current output common-mode direct current voltage of the primary inverter 1 is −1 V. In this case, the primary inverter 1 increases the current output common-mode direct current voltage by 1 V in the negative direction, that is, from −1 V to −2 V.

It may be understood that, for the primary inverter 1, when the positive bus voltage is less than the negative bus voltage, and the output active power is greater than 0, the output common-mode direct current voltage of the primary inverter 1 may be reduced to reduce a discharging current of the positive bus capacitor $C_{11}$ and reduce a charging current of the negative bus capacitor $C_{12}$ (that is, increase a direct current component of a circulating current), so that the positive bus voltage of the primary inverter 1 is increased, and the negative bus voltage is reduced, thereby ensuring that positive and negative bus voltages of the primary inverter 1 are balanced.

In another optional embodiment, if the first voltage difference is greater than a first preset voltage difference threshold, and the output active power is less than 0, it indicates that for the primary inverter 1, the positive bus voltage is greater than the negative bus voltage, and the positive bus capacitor $C_{11}$ is in a charging state, and the negative bus capacitor $C_{12}$ is in a discharging state. In this case, the primary inverter 1 reduces, in a positive direction (that is, a direction from the primary inverter 1 to the alternating current power grid), or increases, in a negative direction (that is, a direction from the alternating current power grid to the primary inverter 1), the output common-mode direct current voltage. The first preset voltage difference threshold is greater than 0.

It may be understood that, for the primary inverter 1, when the positive bus voltage is greater than the negative bus voltage, and the output active power is less than 0, the output common-mode direct current voltage of the primary inverter 1 may be reduced to reduce a charging current of the positive bus capacitor $C_{11}$ and reduce a discharging current of the negative bus capacitor $C_{12}$ (that is, a direct current component of a circulating current), so that the positive bus voltage of the primary inverter 1 is reduced, and the negative bus voltage is increased, thereby ensuring that positive and negative bus voltages of the primary inverter 1 are balanced.

In still another optional embodiment, if the first voltage difference is less than a second preset voltage difference threshold, and the output active power is less than 0, it indicates that for the primary inverter 1, the positive bus voltage is less than the negative bus voltage, and the positive bus capacitor $C_{11}$ is in a charging state, and the negative bus capacitor $C_{12}$ is in a discharging state. In this case, the primary inverter 1 increases, in a positive direction (that is, a direction from the primary inverter 1 to the alternating current power grid), or reduces, in a negative direction (that is, a direction from the alternating current power grid to the primary inverter 1), the output common-mode direct current voltage. The second preset voltage difference threshold is less than 0.

It may be understood that, for the primary inverter 1, when the positive bus voltage is less than the negative bus voltage, and the output active power is less than 0, the output common-mode direct current voltage of the primary inverter 1 may be increased to increase a charging current of the positive bus capacitor $C_{11}$ and increase a discharging current of the negative bus capacitor $C_{12}$ (that is, a direct current component of a circulating current), so that the positive bus voltage of the primary inverter 1 is increased, and the negative bus voltage is reduced, thereby ensuring that positive and negative bus voltages of the primary inverter 1 are balanced.

Further, the primary inverter 1 may obtain a target reference output voltage by adjusting a direct current voltage in an initial reference output voltage and adjust the output common-mode direct current voltage of the primary inverter 1 based on the target reference output voltage.

In an optional embodiment, the primary inverter 1 may increase a direct current voltage in an initial reference output voltage, that is, increase a direct current voltage $u_{dc0}$ in an initial reference output voltage (that is, $u_{11\_ref0}=u_{11ac}+u_{dc0}$, $u_{12\_ref0}=u_{12ac}+u_{dc0}$, and $u_{13\_ref0}=u_{13ac}+u_{dc0}$) of each of three phases of the primary inverter 1 to $u_{dc1}$, so as to obtain a target reference output voltage $u_{11\_ref1}=u_{11ac}+u_{dc1}$, $u_{12\_ref1}=u_{12ac}+u_{dc1}$, and $u_{13\_ref1}=u_{13ac}+u_{dc1}$. A controllable switch tube in an inverter circuit of the primary inverter 1 is controlled to adjust the output voltage of the primary inverter 1 to the target reference output voltage, so as to increase the output common-mode direct current voltage of the primary inverter 1.

Similarly, the primary inverter 1 may increase the direct current voltage in the initial reference output voltage, that is, reduce the direct current voltage $u_{dc0}$ in the initial reference output voltage (that is, $u_{11\_ref0}=u_{11ac}+u_{dc0}$, $u_{12\_ref0}=u_{12ac}+u_{dc0}$, and $u_{13\_ref0}=u_{13ac}+u_{dc0}$) of each of the three phases of the primary inverter 1 to $u_{dc2}$, so as to obtain the target reference output voltage $u_{11\_ref1}=u_{11ac}+u_{dc2}$, $u_{12\_ref1}=u_{12ac}+u_{dc2}$, and $u_{13\_ref1}=u_{13ac}+u_{dc2}$. The controllable switch tube in the inverter circuit of the primary inverter 1 is controlled to adjust the output voltage of the primary inverter 1 to the target reference output voltage, so as to reduce the output common-mode direct current voltage of the primary inverter 1.

Because bus voltage control methods of secondary inverters in the power supply system 10 shown in FIG. 3 are the same, the following uses the secondary inverter 2 as an example for description.

In an implementation, the secondary inverter 2 adjusts an output common-mode direct current of the secondary inverter 2 based on a second voltage difference between a positive bus voltage and a negative bus voltage of the secondary inverter 2, where the output common-mode direct current is a direct current component of a common part in three-phase output currents of the secondary inverter 2, that is, a direct current component in an average value of the three-phase output currents of the secondary inverter 2.

In an optional embodiment, if the second voltage difference is greater than a first preset voltage difference threshold, it indicates that for the secondary inverter 2, the positive bus voltage is greater than the negative bus voltage. In addition, due to a function of circulating current, the negative bus capacitor $C_{22}$ is in a charging state. In this case, the secondary inverter 2 reduces, in a positive direction (that is, a direction from the secondary inverter 2 to the alternating current power grid), or increases, in a negative direction (that is, a direction from the alternating current power grid to the secondary inverter 2), the output common-mode direct current. The first preset voltage difference threshold is greater than 0.

For example, it is assumed that the second voltage difference is 1 V, and the first preset voltage difference threshold is 0.5 V. In this case, the secondary inverter 2 may reduce the output common-mode direct current by 0.5 A in the positive direction, that is, from 1 A to 0.5 A, or increase the output common-mode direct current by 0.5 A in the negative direction, that is, from 1 A to 0.5 A.

It may be understood that, for the secondary inverter 2, when the positive bus voltage is greater than the negative bus voltage, the negative bus voltage of the secondary inverter 2 may be increased by increasing a charging current (that is, a direct current component of a circulating current) of the negative bus capacitor $C_{22}$, so as to ensure that positive and negative bus voltages of the secondary inverter 2 are balanced.

In another optional embodiment, if the second voltage difference is less than a second preset voltage difference threshold, it indicates that for the secondary inverter 2, the positive bus voltage is less than the negative bus voltage. In addition, due to a function of circulating current, the negative bus capacitor $C_{22}$ is in a charging state. In this case, the secondary inverter 2 increases, in a positive direction (that is, a direction from the secondary inverter 2 to the alternating current power grid), or reduces, in a negative direction (that is, a direction from the alternating current power grid to the secondary inverter 2), the output common-mode direct current. The second preset voltage difference threshold is less than 0.

For example, it is assumed that the second voltage difference is −1 V, the second preset voltage difference threshold is −0.5 V, and when the direction from the secondary inverter 2 to the alternating current power grid is the positive direction, a current output common-mode direct current of the secondary inverter 2 is 1 A. In this case, the secondary inverter 2 increases the current output common-mode direct current by 0.5 A in the positive direction, such as from 1 A to 1.5 A.

For another example, it is assumed that the second voltage difference is −1 V, the second preset voltage difference threshold is −0.5 V, and when the direction from the alternating current power grid to the secondary inverter 2 is the negative direction, the current output common-mode direct current of the secondary inverter 2 is −1.5 A. In this case, the secondary inverter 2 reduces the current output common-mode direct current by 0.5 A in the negative direction, such as from −1.5 A to −1 A.

It may be understood that, for the secondary inverter 2, when the positive bus voltage is less than the negative bus voltage, the negative bus voltage of the secondary inverter 2 may be reduced by reducing a charging current (that is, a direct current component of a circulating current) of the negative bus capacitor $C_{22}$, so as to ensure that positive and negative bus voltages of the secondary inverter 2 are balanced.

Further, the secondary inverter 2 may obtain a target reference output voltage by adjusting a direct current voltage in an initial reference output voltage and adjust the output common-mode direct current of the secondary inverter 2 based on the target reference output voltage.

In an optional embodiment, the secondary inverter 2 may increase a direct current voltage in an initial reference output voltage, that is, increase a direct current voltage $u_{dc0}$ in an initial reference output voltage (that is, $u_{21\_ref0}=u_{21ac}+u_{dc0}$, $u_{22\_ref0}=u_{22ae}+u_{dc0}$, and $u_{23\_ref0}=u_{23ae}+u_{dc0}$) of each of three phases of the secondary inverter 2 to $u_{dc1}$, so as to obtain a target reference output voltage $u_{21\_ref1}=u_{21ac}+u_{dc1}$, $u_{22\_ref1}=u_{22ac}+u_{ac1}$, and $u_{23\_ref1}=u_{23ac}+u_{dc1}$. A controllable switch tube in an inverter circuit of the secondary inverter 2 is controlled to adjust the output voltage of the secondary inverter 2 to the target reference output voltage, so as to increase the output common-mode direct current of the secondary inverter 2.

Similarly, the secondary inverter 2 may increase the direct current voltage in the initial reference output voltage, that is, reduce the direct current voltage $u_{dc0}$ in the initial reference output voltage (that is, $u_{21\_ref0}=u_{21ac}+u_{dc0}$, $u_{22\_ref0}=u_{22ac}+u_{dc0}$, and $u_{23\_ref0}=u_{23ac}+u_{dc0}$) of each of the three phases of the secondary inverter 2 to $u_{dc2}$, so as to obtain the target reference output voltage $u_{21\_ref1}=u_{21ac}+u_{dc2}$, $u_{22\_ref1}=u_{22ac}+u_{dc2}$, and $u_{23\_ref1}=u_{23ac}+u_{dc2}$. The controllable switch tube in the inverter circuit of the secondary inverter 2 is controlled to adjust the output voltage of the secondary inverter 2 to the target reference output voltage, so as to reduce the output common-mode direct current of the secondary inverter 2.

It should be noted that, because potentials of the primary inverter 1, the secondary inverter 2, . . . , and the secondary inverter n are all positive for each negative input end thereof (that is, a direct current side parallel point), the primary inverter 1, the secondary inverter 2, . . . , and the secondary inverter n are all positive inverters.

In this embodiment, the primary inverter 1 may ensure that positive and negative bus voltages of the primary inverter 1 are balanced by controlling the output common-mode direct current voltage, and all the secondary inverter 2, . . . , and the secondary inverter n may ensure that positive and negative bus voltages of the secondary inverter 2, . . . , and the secondary inverter n are balanced by controlling output common-mode direct currents of the secondary inverter 2, . . . , and the secondary inverter n, so that the circulating current is stable, and stability of the power supply system 10 is improved. Because no additional device or cable is required, this can reduce costs of the power supply system 10 and has strong applicability.

Based on the power supply system 10 shown in FIG. 3, the embodiment further provides a method for controlling positive and negative bus voltages of an inverter, including:

- adjusting, by a primary inverter, an output common-mode direct current voltage of the primary inverter based on a first voltage difference between a positive bus voltage of the primary inverter and a negative bus voltage of the primary inverter and an output active power of the primary inverter; and
- adjusting, by a secondary inverter, an output common-mode direct current of the secondary inverter based on a second voltage difference between a positive bus voltage of the secondary inverter and a negative bus voltage of the secondary inverter.

Figure 4:
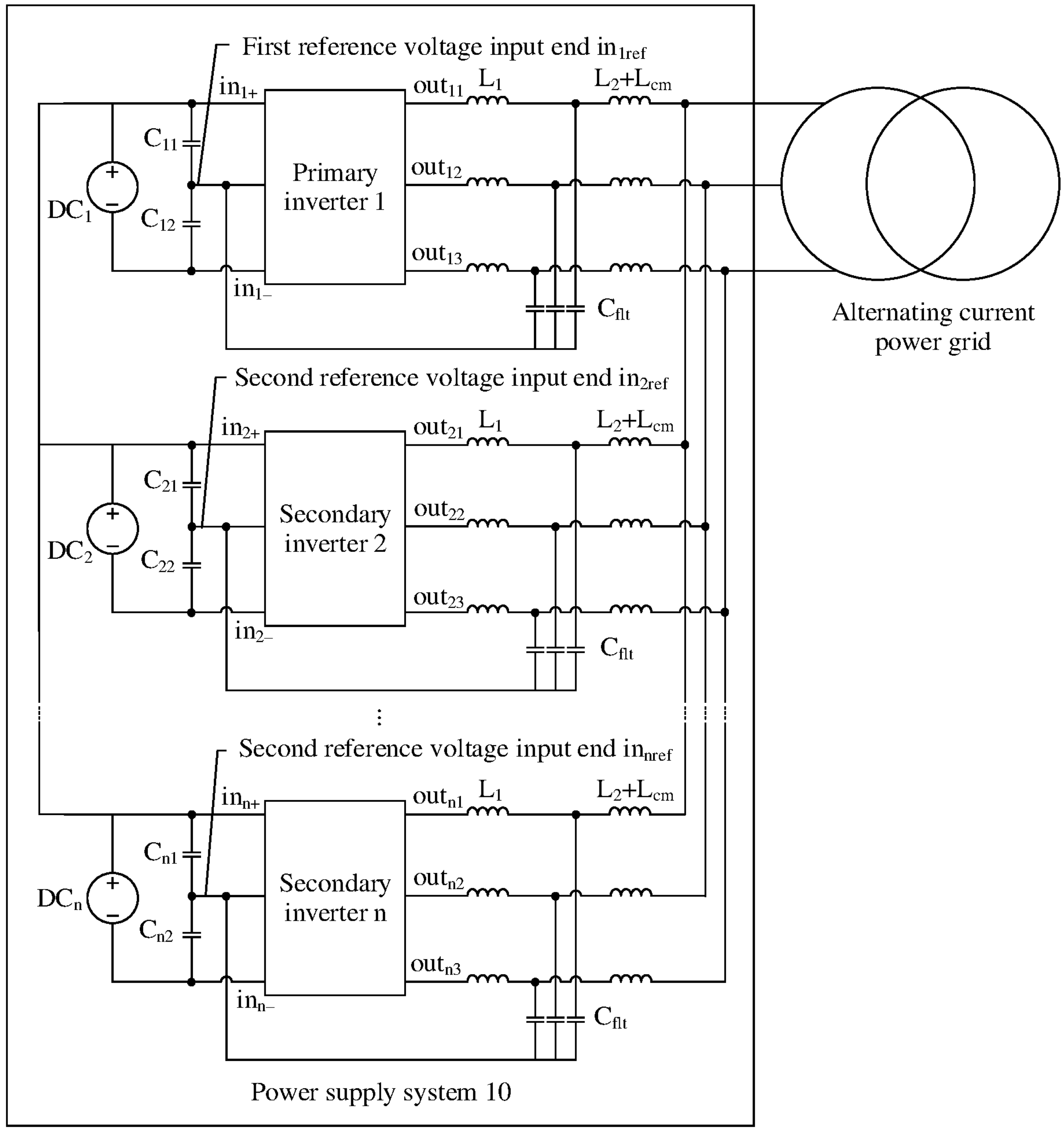
FIG. 4 is a schematic diagram of a structure of a power supply system of a common positive direct current bus.

FIG. 4 is a schematic structural diagram of a power supply system of a common positive direct current bus. As shown in FIG. 4, a power supply system 10 includes a primary inverter 1 and at least one secondary inverter (corresponding to a secondary inverter 2, . . . , and a secondary inverter n) corresponding to the primary inverter 1. A positive input end $in_{1+}$ and a negative input end $in_{1-}$ of the primary inverter 1 are connected to a direct current power supply $DC_1$, a positive input end $in_{2+}$ and a negative input end $in_{2-}$ of the secondary inverter 2 are connected to a direct current power supply $DC_2$, . . . , and a positive input end $in_{n+}$ and a negative input end $in_{n-}$ of the secondary inverter n are connected to a direct current power supply $DC_n$. The positive input end $in_{1+}$ of the primary inverter 1 is connected to the negative input end $in_{1-}$ of the primary inverter 1 after passing through a positive bus capacitor $C_{11}$ and a negative bus capacitor $C_{12}$, the positive input end $in_{2+}$ of the secondary inverter 2 is connected to the negative input end $in_{2-}$ of the secondary inverter 2 after passing through a positive bus capacitor $C_{21}$ and a negative bus capacitor $C_{22}$, . . . , and the positive input end $in_{n+}$ of the secondary inverter n is connected to the negative input end $in_{n-}$, of the secondary inverter n after passing through a positive bus capacitor $C_{n1}$ and a negative bus capacitor $C_{n2}$. The positive input end $in_{1+}$ of the primary inverter 1, the positive input end $in_{2+}$ of the secondary inverter 2, . . . , and the positive input end $in_{n+}$ of the secondary inverter n are connected to each other. Three-phase output ends $out_1$1, $out_{12}$, and $out_{13}$ of the primary inverter 1, three-phase output ends $out_{21}$, $out_{22}$, and $out_{23}$ of the secondary inverter 2, . . . , and three-phase output ends $out_{n1}$, $out_{n2}$, and $out_{n3}$ of the secondary inverter n are connected to each other after passing through corresponding inductors $L_1$ and $L_2+L_{an}$ thereof respectively, and then are connected to an alternating current power grid.

In an implementation, the primary inverter 1 obtains a voltage between $in_{1+}$ and a first reference voltage input end $in_{1ref}$ in real time, to obtain a positive bus voltage (that is, a voltage at two ends of $C_{11}$) of the primary inverter 1, obtains a voltage between $in_{1ref}$ and $in_{1-}$, to obtain a negative bus voltage (that is, a voltage at two ends of $C_{12}$) of the primary inverter 1, and obtains an output voltage and an output current of the primary inverter 1; the secondary inverter 2 obtains a voltage between $in_{2+}$ and a second reference voltage input end $in_{nref}$ in real time, to obtain a positive bus voltage (that is, a voltage at two ends of $C_{21}$) of the secondary inverter 2, and obtains a voltage between $in_{nref}$ and $in_2$, to obtain a negative bus voltage (that is, a voltage at two ends of $C_{22}$) of the secondary inverter 2; . . . ; and the secondary inverter n obtains a voltage between $in_{n+}$ and a second reference voltage input end $in_{nref}$ in real time, to obtain a positive bus voltage (that is, a voltage at two ends of $C_{n1}$) of the secondary inverter n, and obtains a voltage between $in_{nref}$ and $in_{n-}$, to obtain a negative bus voltage (that is, a voltage at two ends of $C_{n2}$) of the secondary inverter n. $in_{1ref}$, $in_{2ref}$, . . . , and $in_{nref}$ may all be understood as reference grounds.

When both a phase of the output voltage and a phase of the output current of the primary inverter 1 are $\pi N_1$, it is determined that an output active power of the primary inverter 1 is greater than 0, that is, the output active power of the primary inverter 1 flows from the primary inverter 1 to the alternating current power grid; and when both the phase of the output voltage and the phase of the output current of the primary inverter 1 are $\pi N_2$, it is determined that the output active power of the primary inverter 1 is less than 0, that is, the output active power of the primary inverter 1 flows from the alternating current power grid to the primary inverter 1. $N_1$ is a positive even number, and $N_2$ is a positive odd number.

The primary inverter 1 adjusts an output common-mode direct current voltage of the primary inverter 1 based on a first voltage difference between the positive bus voltage and the negative bus voltage and the output active power of the primary inverter 1, where the output common-mode direct current voltage is a direct current component of a common part in three-phase output voltages of the primary inverter 1, that is, a direct current component in an average value of the three-phase output voltages of the primary inverter 1.

In an optional embodiment, if the first voltage difference is greater than a first preset voltage difference threshold, and the output active power is greater than 0, it indicates that for the primary inverter 1, the positive bus voltage is greater than the negative bus voltage, and the positive bus capacitor $C_{11}$ is in a discharging state, and the negative bus capacitor $C_{12}$ is in a charging state. In this case, the primary inverter 1 increases, in a positive direction (that is, a direction from the primary inverter 1 to the alternating current power grid), or reduces, in a negative direction (that is, a direction from the alternating current power grid to the primary inverter 1), the output common-mode direct current voltage. The first preset voltage difference threshold is greater than 0.

It may be understood that, for the primary inverter 1, when the positive bus voltage is greater than the negative bus voltage, and the output active power is greater than 0, the output common-mode direct current voltage of the primary inverter 1 may be increased to increase a discharging current of the positive bus capacitor Cu (that is, reduce a direct current component of a circulating current) and increase a charging current of the negative bus capacitor $C_{12}$, so that the positive bus voltage of the primary inverter 1 is reduced, and the negative bus voltage is increased, thereby ensuring that positive and negative bus voltages of the primary inverter 1 are balanced.

In another optional embodiment, if the first voltage difference is less than a second preset voltage difference threshold, and the output active power is greater than 0, it indicates that for the primary inverter 1, the positive bus voltage is less than the negative bus voltage, and the positive bus capacitor $C_{11}$ is in a discharging state, and the negative bus capacitor $C_{12}$ is in a charging state. In this case, the primary inverter 1 reduces, in a positive direction (that is, a direction from the primary inverter 1 to the alternating current power grid), or increases, in a negative direction (that is, a direction from the alternating current power grid to the primary inverter 1), the output common-mode direct current voltage. The second preset voltage difference threshold is less than 0.

It may be understood that, for the primary inverter 1, when the positive bus voltage is less than the negative bus voltage, and the output active power is greater than 0, the output common-mode direct current voltage of the primary inverter 1 may be reduced to reduce a discharging current of the positive bus capacitor $C_{11}$ (that is, increase a direct current component of a circulating current) and reduce a charging current of the negative bus capacitor $C_{12}$, so that the positive bus voltage of the primary inverter 1 is increased, and the negative bus voltage is reduced, thereby ensuring that positive and negative bus voltages of the primary inverter 1 are balanced.

In another optional embodiment, if the first voltage difference is greater than a first preset voltage difference threshold, and the output active power is less than 0, it indicates that for the primary inverter 1, the positive bus voltage is greater than the negative bus voltage, and the positive bus capacitor $C_{11}$ is in a charging state, and the negative bus capacitor $C_{12}$ is in a discharging state. In this case, the primary inverter 1 reduces, in a positive direction (that is, a direction from the primary inverter 1 to the alternating current power grid), or increases, in a negative direction (that is, a direction from the alternating current power grid to the primary inverter 1), the output common-mode direct current voltage. The first preset voltage difference threshold is greater than 0.

It may be understood that, for the primary inverter 1, when the positive bus voltage is greater than the negative bus voltage, and the output active power is less than 0, the output common-mode direct current voltage of the primary inverter 1 may be reduced to reduce a charging current of the positive bus capacitor $C_{11}$ (that is, a direct current component of a circulating current) and reduce a discharging current of the negative bus capacitor $C_{12}$, so that the positive bus voltage of the primary inverter 1 is reduced, and the negative bus voltage is increased, thereby ensuring that positive and negative bus voltages of the primary inverter 1 are balanced.

In still another optional embodiment, if the first voltage difference is less than a second preset voltage difference threshold, and the output active power is less than 0, it indicates that for the primary inverter 1, the positive bus voltage is less than the negative bus voltage, and the positive bus capacitor $C_{11}$ is in a charging state, and the negative bus capacitor $C_{12}$ is in a discharging state. In this case, the primary inverter 1 increases, in a positive direction (that is, a direction from the primary inverter 1 to the alternating current power grid), or reduces, in a negative direction (that is, a direction from the alternating current power grid to the primary inverter 1), the output common-mode direct current voltage. The second preset voltage difference threshold is less than 0.

It may be understood that, for the primary inverter 1, when the positive bus voltage is less than the negative bus voltage, and the output active power is less than 0, the output common-mode direct current voltage of the primary inverter 1 may be increased to increase a charging current of the positive bus capacitor $C_{11}$ (that is, a direct current component of a circulating current) and increase a discharging current of the negative bus capacitor $C_{12}$, so that the positive bus voltage of the primary inverter 1 is increased, and the negative bus voltage is reduced, thereby ensuring that positive and negative bus voltages of the primary inverter 1 are balanced.

Further, the primary inverter 1 may obtain a target reference output voltage by adjusting a direct current voltage in an initial reference output voltage and adjust the output common-mode direct current voltage of the primary inverter 1 based on the target reference output voltage.

In an optional embodiment, the primary inverter 1 may increase a direct current voltage in an initial reference output voltage, that is, increase a direct current voltage $u_{dc0}$ in an initial reference output voltage (that is, $u_{11\_ref0}=u_{11ac}+u_{dc0}$, $u_{12\_ref0}=u_{12ac}+u_{dc0}$, and $u_{13\_ref0}=u_{13ac}+u_{dc0}$) of each of three phases of the primary inverter 1 to $u_{dc1}$, so as to obtain a target reference output voltage $u_{11\_ref1}=u_{11ac}+u_{dc1}$, $u_{12\_ref1}=u_{12ac}+u_{dc1}$, and $u_{13\_ref1}=u_{13ac}+u_{dc1}$. A controllable switch tube in an inverter circuit of the primary inverter 1 is controlled to adjust the output voltage of the primary inverter 1 to the target reference output voltage, so as to increase the output common-mode direct current voltage of the primary inverter 1.

Similarly, the primary inverter 1 may increase the direct current voltage in the initial reference output voltage, that is, reduce the direct current voltage $u_{dc0}$ in the initial reference output voltage (that is, $u_{11\_ref0}=u_{11ac}+u_{dc0}$, $u_{12\_ref0}=u_{12ac}+u_{dc0}$, and $u_{13\_ref0}=u_{13ac}+u_{dc0}$) of each of the three phases of the primary inverter 1 to $u_{dc2}$, so as to obtain the target reference output voltage $u_{11\_ref1}=u_{11ac}+u_{dc2}$, $u_{12\_ref1}=u_{12ac}+u_{dc2}$, and $u_{13\_ref1}=u_{13ac}+u_{dc2}$. The controllable switch tube in the inverter circuit of the primary inverter 1 is controlled to adjust the output voltage of the primary inverter 1 to the target reference output voltage, so as to reduce the output common-mode direct current voltage of the primary inverter 1.

Because bus voltage control methods of secondary inverters in the power supply system 10 shown in FIG. 4 are the same, the following uses the secondary inverter 2 as an example for description.

In an implementation, the secondary inverter 2 adjusts an output common-mode direct current of the secondary inverter 2 based on a second voltage difference between a positive bus voltage and a negative bus voltage of the secondary inverter 2, where the output common-mode direct current is a direct current component of a common part in three-phase output currents of the secondary inverter 2, that is, a direct current component in an average value of the three-phase output currents of the secondary inverter 2.

In an optional embodiment, if the second voltage difference is greater than a first preset voltage difference threshold, it indicates that for the secondary inverter 2, the positive bus voltage is greater than the negative bus voltage. In addition, due to a function of circulating current, the positive bus capacitor $C_{21}$ is in a discharging state. In this case, the secondary inverter 2 reduces, in a positive direction (that is, a direction from the secondary inverter 2 to the alternating current power grid), or increases, in a negative direction (that is, a direction from the alternating current power grid to the secondary inverter 2), the output common-mode direct current. The first preset voltage difference threshold is greater than 0.

It may be understood that, for the secondary inverter 2, when the positive bus voltage is greater than the negative bus voltage, the positive bus voltage of the secondary inverter 2 may be reduced by increasing a discharging current (that is, a direct current component of a circulating current) of the positive bus capacitor $C_{21}$, so as to ensure that positive and negative bus voltages of the secondary inverter 2 are balanced.

In another optional embodiment, if the second voltage difference is less than a second preset voltage difference threshold, it indicates that for the secondary inverter 2, the positive bus voltage is less than the negative bus voltage. In addition, due to a function of circulating current, the positive bus capacitor $C_{21}$ is in a discharging state. In this case, the secondary inverter 2 increases, in a positive direction (that is, a direction from the secondary inverter 2 to the alternating current power grid), or reduces, in a negative direction (that is, a direction from the alternating current power grid to the secondary inverter 2), the output common-mode direct current. The second preset voltage difference threshold is less than 0.

It may be understood that, for the secondary inverter 2, when the positive bus voltage is less than the negative bus voltage, the positive bus voltage of the secondary inverter 2 may be increased by reducing a discharging current (that is, a direct current component of a circulating current) of the positive bus capacitor $C_{21}$, so as to ensure that positive and negative bus voltages of the secondary inverter 2 are balanced.

Further, the secondary inverter 2 may obtain a target reference output voltage by adjusting a direct current voltage in an initial reference output voltage and adjust the output common-mode direct current of the secondary inverter 2 based on the target reference output voltage.

In an optional embodiment, the secondary inverter 2 may increase a direct current voltage in an initial reference output voltage, that is, increase a direct current voltage $u_{dc0}$ in an initial reference output voltage (that is, $u_{21\_ref0}=u_{21ac}+u_{dc0}$, $u_{22\_ref1}=u_{22ac}+u_{dc0}$, and $u_{23\_ref0}=u_{23ac}+u_{dc0}$) of each of three phases of the secondary inverter 2 to $u_{dc1}$, so as to obtain a target reference output voltage $u_{21\_ref1}=u_{21ac}+u_{dc1}$, $u_{22\_ref1}=u_{22ac}+u_{dc1}$, and $u_{23\_ref1}=u_{23ac}+u_{dc1}$. A controllable switch tube in an inverter circuit of the secondary inverter 2 is controlled to adjust the output voltage of the secondary inverter 2 to the target reference output voltage, so as to increase the output common-mode direct current of the secondary inverter 2.

Similarly, the secondary inverter 2 may increase the direct current voltage in the initial reference output voltage, that is, reduce the direct current voltage $u_{dc0}$ in the initial reference output voltage (that is, $u_{21\_ref0}=u_{21ac}+u_{dc0}$, $u_{22\_ref0}=u_{22ac}+u_{dc0}$, and $u_{23\_ref0}=u_{23ac}+u_{dc0}$) of each of the three phases of the secondary inverter 2 to $u_{dc2}$, so as to obtain the target reference output voltage $u_{21\_ref1}=u_{21ac}+u_{dc2}$, $u_{22\_ref1}=u_{22ac}+u_{dc2}$, and $u_{23\_ref1}=u_{23ac}+u_{dc2}$. The controllable switch tube in the inverter circuit of the secondary inverter 2 is controlled to adjust the output voltage of the secondary inverter 2 to the target reference output voltage, so as to reduce the output common-mode direct current of the secondary inverter 2.

It should be noted that, because potentials of the primary inverter 1, the secondary inverter 2, . . . , and the secondary inverter n are all negative for each positive input end thereof (that is, a direct current side parallel point), the primary inverter 1, the secondary inverter 2, . . . , and the secondary inverter n are all negative inverters.

In this embodiment, the primary inverter 1 may ensure that positive and negative bus voltages of the primary inverter 1 are balanced by controlling the output common-mode direct current voltage, and all the secondary inverter 2, . . . , and the secondary inverter n may ensure that positive and negative bus voltages of the secondary inverter 2, . . . , and the secondary inverter n are balanced by controlling output common-mode direct currents of the secondary inverter 2, . . . , and the secondary inverter n, so that the circulating current is stable, and stability of the power supply system 10 is improved. Because no additional device or cable is required, this can reduce costs of the power supply system 10 and has strong applicability.

Based on the power supply system 10 shown in FIG. 4, the embodiment further provides a method for controlling positive and negative bus voltages of an inverter, including:

adjusting, by a primary inverter, an output common-mode direct current voltage of the primary inverter based on a first voltage difference between a positive bus voltage of the primary inverter and a negative bus voltage of the primary inverter and an output active power of the primary inverter; and adjusting, by a secondary inverter, an output common-mode direct current of the secondary inverter based on a second voltage difference between a positive bus voltage of the secondary inverter and a negative bus voltage of the secondary inverter.

Figure 5A:
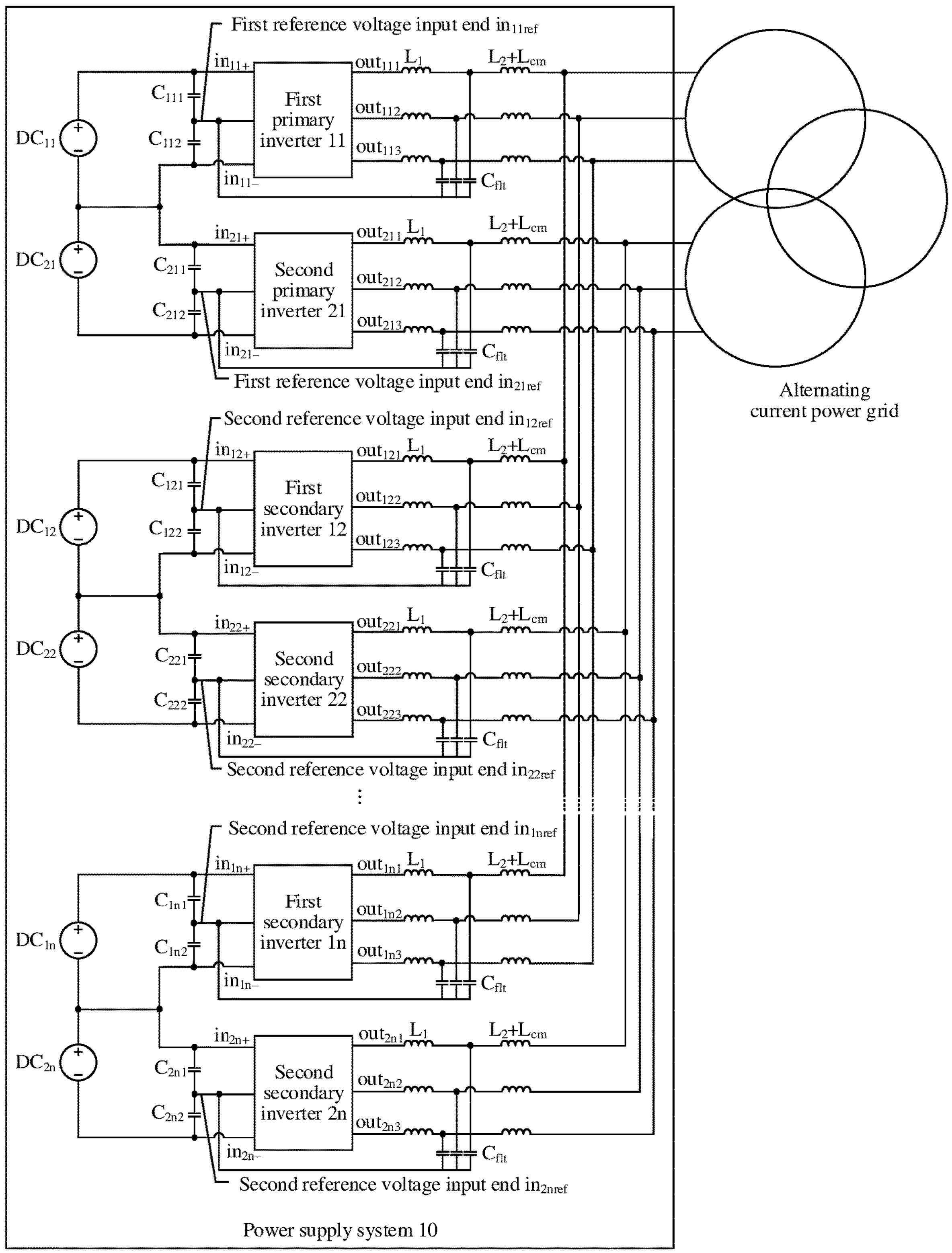
FIG. 5*a* is a schematic diagram of a structure of a power supply system of a bipolar series-parallel combination.

FIG. 5*a* is a schematic diagram of a structure of a power supply system of a bipolar series-parallel combination. As shown in FIG. 5*a*, a power supply system 10 includes a first group of inverters and a second group of inverters. The first group of inverters include a first primary inverter 11 and at least one first secondary inverter (corresponding to a first secondary inverter 12, . . . , and a first secondary inverter 1*n*) corresponding to the first primary inverter 11, and the second group of inverters include a second primary inverter 21 and at least one second secondary inverter (corresponding to a second secondary inverter 22, . . . , and a second secondary inverter 2*n*) corresponding to the second primary inverter 21. Details are as follows.

A positive input end $in_{n+}$ and a negative input end $in_{11-}$ of the first primary inverter 11 are connected to a direct current power supply $DC_{11}$, a positive input end $in_{12+}$ and a negative input end $in_{12-}$ of the first secondary inverter 12 are connected to a direct current power supply $DC_{12}$, . . . , and a positive input end $in_{1n+}$ and a negative input end $in_{n1-}$, of the first secondary inverter 1*n* are connected to a direct current power supply $DC_{1n}$. The positive input end $in_{n+}$ of the first primary inverter 11 is connected to the negative input end $in_{n-}$ of the first primary inverter 11 after passing through a positive bus capacitor $C_{111}$ and a negative bus capacitor $C_{112}$, the positive input end $in_{12+}$ of the first secondary inverter 12 is connected to the negative input end $in_{12-}$ of the first secondary inverter 12 after passing through a positive bus capacitor $C_{121}$ and a negative bus capacitor $C_{122}$, . . . , and the positive input end $in_{1n+}$ of the first secondary inverter 1*n* is connected to the negative input end $in_{1n-}$ of the first secondary inverter 1*n* after passing through a positive bus capacitor $C_{1n1}$ and a negative bus capacitor $C_{1n2}$. Three-phase output ends $out_{111}$, $out_{112}$, and $out_{113}$ of the first primary inverter 11, three-phase output ends $out_{121}$, $out_{122}$, and $out_{123}$ of the first secondary inverter 12, . . . , and three-phase output ends $out_{121}$, $out_{122}$, and $out_{123}$ of the first secondary inverter 1*n* are connected to each other after passing through corresponding inductors $L_1$ and $L_2+L_{cm}$ thereof respectively, and then are connected to an alternating current power grid.

A positive input end $in_{21+}$ and a negative input end $in_{21-}$ of the second primary inverter 21 are connected to a direct current power supply $DC_{21}$, a positive input end $in_{22+}$ and a negative input end $in_{22-}$ of the second secondary inverter 22 are connected to a direct current power supply $DC_{22}$, . . . , and a positive input end $in_{2n+}$ and a negative input end $in_{2-}$ of the second secondary inverter 2*n* are connected to a direct current power supply $DC_{2n}$. The positive input end $in_{21+}$ of the second primary inverter 21 is connected to the negative input end $in_{21-}$ of the second primary inverter 21 after passing through a positive bus capacitor $C_{211}$ and a negative bus capacitor $C_{212}$, the positive input end $in_{22+}$ of the second secondary inverter 22 is connected to the negative input end $in_{22-}$ of the second secondary inverter 22 after passing through a positive bus capacitor $C_{221}$ and a negative bus capacitor $C_{222}$, . . . , and the positive input end $in_{2n+}$ of the second secondary inverter 2*n* is connected to the negative input end $in_{2n-}$ of the second secondary inverter 2*n* after passing through a positive bus capacitor $C_{2n1}$ and a negative bus capacitor $C_{2n2}$. Three-phase output ends $out_{211}$, $out_{212}$, and $out_{213}$ of the second primary inverter 21, three-phase output ends $out_{221}$, $out_{222}$, and $out_{223}$ of the second secondary inverter 22, . . . , and three-phase output ends $out_{2n1}$, $out_{2n2}$, and $out_{2n3}$ of the second secondary inverter 2*n* are connected to each other after passing through corresponding inductors $L_1$ and $L_2+L_{cm}$ thereof respectively, and then are connected to an alternating current power grid.

The negative input end $in_{11-}$ of the first primary inverter 11 is connected to the positive input end $in_{21+}$ of the second primary inverter 21, the negative input end $in_{12-}$ of the first secondary inverter 12 is connected to the positive input end $in_{22+}$ of the second secondary inverter 22, . . . , and the negative input end $in_{1n-}$ of the first secondary inverter 1*n* is connected to the positive input end $in_{2n+}$ of the second secondary inverter 2*n*.

In an implementation, the first primary inverter 11 obtains a voltage between $in_{n+}$ and a first reference voltage input end $in_{11ref}$ in real time, to obtain a positive bus voltage (that is, a voltage at two ends of $C_{111}$) of the first primary inverter 11, obtains a voltage between $in_{11ref}$ and $in_{11-}$, to obtain a negative bus voltage (that is, a voltage at two ends of $C_{112}$) of the first primary inverter 11, and obtains an output voltage and an output current of the first primary inverter 11; the first secondary inverter 12 obtains a voltage between $in_{12+}$ and a second reference voltage input end $in_{11ref}$ in real time, to obtain a positive bus voltage (that is, a voltage at two ends of $C_{121}$) of the first secondary inverter 12, and obtains a voltage between $in_{11ref}$ and $in_{12-}$, to obtain a negative bus voltage (that is, a voltage at two ends of $C_{122}$) of the first secondary inverter 12; . . . ; and the first secondary inverter 1*n* obtains a voltage between $in_{1n+}$ and a second reference voltage input end $in_{1nref}$ in real time, to obtain a positive bus voltage (that is, a voltage at two ends of Cirri) of the first secondary inverter 1*n*, and obtains a voltage between $in_{1nref}$ and $in_{1n-}$, to obtain a negative bus voltage (that is, a voltage at two ends of $C_{1n2}$) of the first secondary inverter 1*n*. $in_{11ref}$, $in_{12ref}$, . . . , and $in_{1nref}$ may all be understood as reference grounds.

The second primary inverter 21 obtains a voltage between $in_{21+}$ and a first reference voltage input end $in_{21ref}$ in real time, to obtain a positive bus voltage (that is, a voltage at two ends of $C_{211}$) of the second primary inverter 21, obtains a voltage between $in_{21ref}$ and $in_{21-}$, to obtain a negative bus voltage (that is, a voltage at two ends of $C_{212}$) of the second primary inverter 21, and obtains an output voltage and an output current of the second primary inverter 21; the second secondary inverter 22 obtains a voltage between $in_{22+}$ and a second reference voltage input end $in_{22ref}$ in real time, to obtain a positive bus voltage (that is, a voltage at two ends of $C_{221}$) of the second secondary inverter 22, and obtains a voltage between $in_{22ref}$ and $in_{22-}$, to obtain a negative bus voltage (that is, a voltage at two ends of $C_{222}$) of the second secondary inverter 22; . . . ; and the second secondary inverter 2*n* obtains a voltage between $in_{2n+}$ and a second reference voltage input end $in_{2nref}$ in real time, to obtain a positive bus voltage (that is, a voltage at two ends of $C_{2n1}$) of the second secondary inverter 2*n*, and obtains a voltage between $in_{2nref}$ and $in_{2n-}$, to obtain a negative bus voltage (that is, a voltage at two ends of $C_{2n2}$) of the second secondary inverter 2*n*. $in_{21ref}$, $in_{22ref}$, . . . , and $in_{2nref}$ may all be understood as reference grounds.

Because bus voltage control methods of the first primary inverter 11 and the second primary inverter 21 are the same, the following uses the first primary inverter 11 as an example for description.

When both a phase of the output voltage and a phase of the output current of the first primary inverter 11 are $\pi N_1$, it is determined that an output active power of the first primary inverter 11 is greater than 0, that is, the output active power of the first primary inverter 11 flows from the first primary inverter 11 to the alternating current power grid; and when both the phase of the output voltage and the phase of the output current of the first primary inverter 11 are $\pi N_2$, it is determined that the output active power of the first primary inverter 11 is less than 0, that is, the output active power of the first primary inverter 11 flows from the alternating current power grid to the first primary inverter 11. $N_1$ is a positive even number, and $N_2$ is a positive odd number.

The first primary inverter 11 adjusts an output common-mode direct current voltage of the first primary inverter 11 based on a first voltage difference between the positive bus voltage and the negative bus voltage and the output active power of the first primary inverter 11, where the output common-mode direct current voltage is a direct current component of a common part in three-phase output voltages of the first primary inverter 11, that is, a direct current component in an average value of the three-phase output voltages of the first primary inverter 11.

In an optional embodiment, if the first voltage difference is greater than a first preset voltage difference threshold, and the output active power is greater than 0, it indicates that for the first primary inverter 11, the positive bus voltage is greater than the negative bus voltage, and the positive bus capacitor $C_{111}$ is in a discharging state, and the negative bus capacitor $C_{112}$ is in a charging state. In this case, the first primary inverter 11 increases, in a positive direction (that is, a direction from the first primary inverter 11 to the alternating current power grid), or reduces, in a negative direction (that is, a direction from the alternating current power grid to the first primary inverter 11), the output common-mode direct current voltage. The first preset voltage difference threshold is greater than 0.

It may be understood that, for the first primary inverter 11, when the positive bus voltage is greater than the negative bus voltage, and the output active power is greater than 0, the output common-mode direct current voltage of the first primary inverter 11 may be increased to increase a discharging current of the positive bus capacitor $C_{111}$ and increase a charging current of the negative bus capacitor C 112 (that is, reduce a direct current component of a circulating current), so that the positive bus voltage of the first primary inverter 11 is reduced, and the negative bus voltage is increased, thereby ensuring that positive and negative bus voltages of the first primary inverter 11 are balanced.

In another optional embodiment, if the first voltage difference is less than a second preset voltage difference threshold, and the output active power is greater than 0, it indicates that for the first primary inverter 11, the positive bus voltage is less than the negative bus voltage, and the positive bus capacitor $C_{111}$ is in a discharging state, and the negative bus capacitor $C_{112}$ is in a charging state. In this case, the first primary inverter 11 reduces, in a positive direction (that is, a direction from the first primary inverter 11 to the alternating current power grid), or increases, in a negative direction (that is, a direction from the alternating current power grid to the first primary inverter 11), the output common-mode direct current voltage. The second preset voltage difference threshold is less than 0.

It may be understood that, for the primary inverter 1, when the positive bus voltage is less than the negative bus voltage, and the output active power is greater than 0, the output common-mode direct current voltage of the first primary inverter 11 may be reduced to reduce a discharging current of the positive bus capacitor C 1*n* and reduce a charging current of the negative bus capacitor C 112 (that is, increase a direct current component of a circulating current), so that the positive bus voltage of the first primary inverter 11 is increased, and the negative bus voltage is reduced, thereby ensuring that positive and negative bus voltages of the first primary inverter 11 are balanced.

In another optional embodiment, if the first voltage difference is greater than a first preset voltage difference threshold, and the output active power is less than 0, it indicates that for the first primary inverter 11, the positive bus voltage is greater than the negative bus voltage, and the positive bus capacitor $C_{111}$ is in a charging state, and the negative bus capacitor $C_{112}$ is in a discharging state. In this case, the first primary inverter 11 reduces, in a positive direction (that is, a direction from the first primary inverter 11 to the alternating current power grid), or increases, in a negative direction (that is, a direction from the alternating current power grid to the first primary inverter 11), the output common-mode direct current voltage. The first preset voltage difference threshold is greater than 0.

It may be understood that, for the first primary inverter 11, when the positive bus voltage is greater than the negative bus voltage, and the output active power is less than 0, the output common-mode direct current voltage of the first primary inverter 11 may be reduced to reduce a charging current of the positive bus capacitor $C_{111}$ and reduce a discharging current of the negative bus capacitor C 12 (that is, a direct current component of a circulating current), so that the positive bus voltage of the first primary inverter 11 is reduced, and the negative bus voltage is increased, thereby ensuring that positive and negative bus voltages of the first primary inverter 11 are balanced.

In still another optional embodiment, if the first voltage difference is less than a second preset voltage difference threshold, and the output active power is less than 0, it indicates that for the first primary inverter 11, the positive bus voltage is less than the negative bus voltage, and the positive bus capacitor $C_{111}$ is in a charging state, and the negative bus capacitor $C_{112}$ is in a discharging state. In this case, the first primary inverter 11 increases, in a positive direction (that is, a direction from the first primary inverter 11 to the alternating current power grid), or reduces, in a negative direction (that is, a direction from the alternating current power grid to the first primary inverter 11), the output common-mode direct current voltage. The second preset voltage difference threshold is less than 0.

It may be understood that, for the first primary inverter 11, when the positive bus voltage is less than the negative bus voltage, and the output active power is less than 0, the output common-mode direct current voltage of the first primary inverter 11 may be increased to increase a charging current of the positive bus capacitor $C_{111}$ and increase a discharging current of the negative bus capacitor C 12 (that is, a direct current component of a circulating current), so that the positive bus voltage of the first primary inverter 11 is increased, and the negative bus voltage is reduced, thereby ensuring that positive and negative bus voltages of the first primary inverter 11 are balanced.

Further, the first primary inverter 11 may obtain a target reference output voltage by adjusting a direct current voltage in an initial reference output voltage and may adjust the output common-mode direct current voltage of the first primary inverter 11 based on the target reference output voltage. Herein, for an implementation of adjusting the output common-mode direct current voltage, refer to the description of the corresponding part in the embodiment shown in FIG. 3 or FIG. 4, and details are not described herein again.

Because bus voltage control methods of secondary inverters in the first group of inverters and the second group of inverters in the power supply system 10 shown in FIG. 5*a* are the same, the following uses the first secondary inverter 12 as an example for description.

In an implementation, the first secondary inverter 2 adjusts an output common-mode direct current of the first secondary inverter 12 based on a second voltage difference between a positive bus voltage and a negative bus voltage of the first secondary inverter 12, where the output common-mode direct current is a direct current component of a common part in three-phase output currents of the first secondary inverter 12, that is, a direct current component in an average value of the three-phase output currents of the first secondary inverter 12.

In an optional embodiment, if the second voltage difference is greater than a first preset voltage difference threshold, it indicates that for the first secondary inverter 12, the positive bus voltage is greater than the negative bus voltage. In addition, due to a function of circulating current, the negative bus capacitor $C_{122}$ is in a charging state. In this case, the first secondary inverter 12 reduces, in a positive direction (that is, a direction from the first secondary inverter 12 to the alternating current power grid), or increases, in a negative direction (that is, a direction from the alternating current power grid to the first secondary inverter 12), the output common-mode direct current. The first preset voltage difference threshold is greater than 0.

It may be understood that, for the first secondary inverter 12, when the positive bus voltage is greater than the negative bus voltage, the negative bus voltage of the first secondary inverter 12 may be increased by increasing a charging current (that is, a direct current component of a circulating current) of the negative bus capacitor $C_{122}$, so as to ensure that positive and negative bus voltages of the first secondary inverter 12 are balanced.

In another optional embodiment, if the second voltage difference is less than a second preset voltage difference threshold, it indicates that for the first secondary inverter 12, the positive bus voltage is less than the negative bus voltage. In addition, due to a function of circulating current, the capacitor $C_{122}$ is in a charging state. In this case, the first secondary inverter 12 increases, in a positive direction (that is, a direction from the first secondary inverter 12 to the alternating current power grid), or reduces, in a negative direction (that is, a direction from the alternating current power grid to the first secondary inverter 12), the output common-mode direct current. The second preset voltage difference threshold is less than 0.

It may be understood that, for the first secondary inverter 12, when the positive bus voltage is less than the negative bus voltage, the negative bus voltage of the first secondary inverter 12 may be reduced by reducing a charging current (that is, a direct current component of a circulating current) of the negative bus capacitor $C_{122}$, so as to ensure that positive and negative bus voltages of the first secondary inverter 12 are balanced.

Further, the first secondary inverter 12 may obtain a target reference output voltage by adjusting a direct current voltage in an initial reference output voltage and may adjust the output common-mode direct current of the first secondary inverter 12 based on the target reference output voltage. Herein, for an implementation of adjusting the output common-mode direct current, refer to the description of the corresponding part in the embodiment shown in FIG. 3 or FIG. 4, and details are not described herein again.

It should be noted that, because a potential of the negative input end of the first group of inverters is higher than a potential of the negative input end of the second group of inverters, the first group of inverters are positive inverters, and the second group of inverters are negative inverters.

Figure 5B:
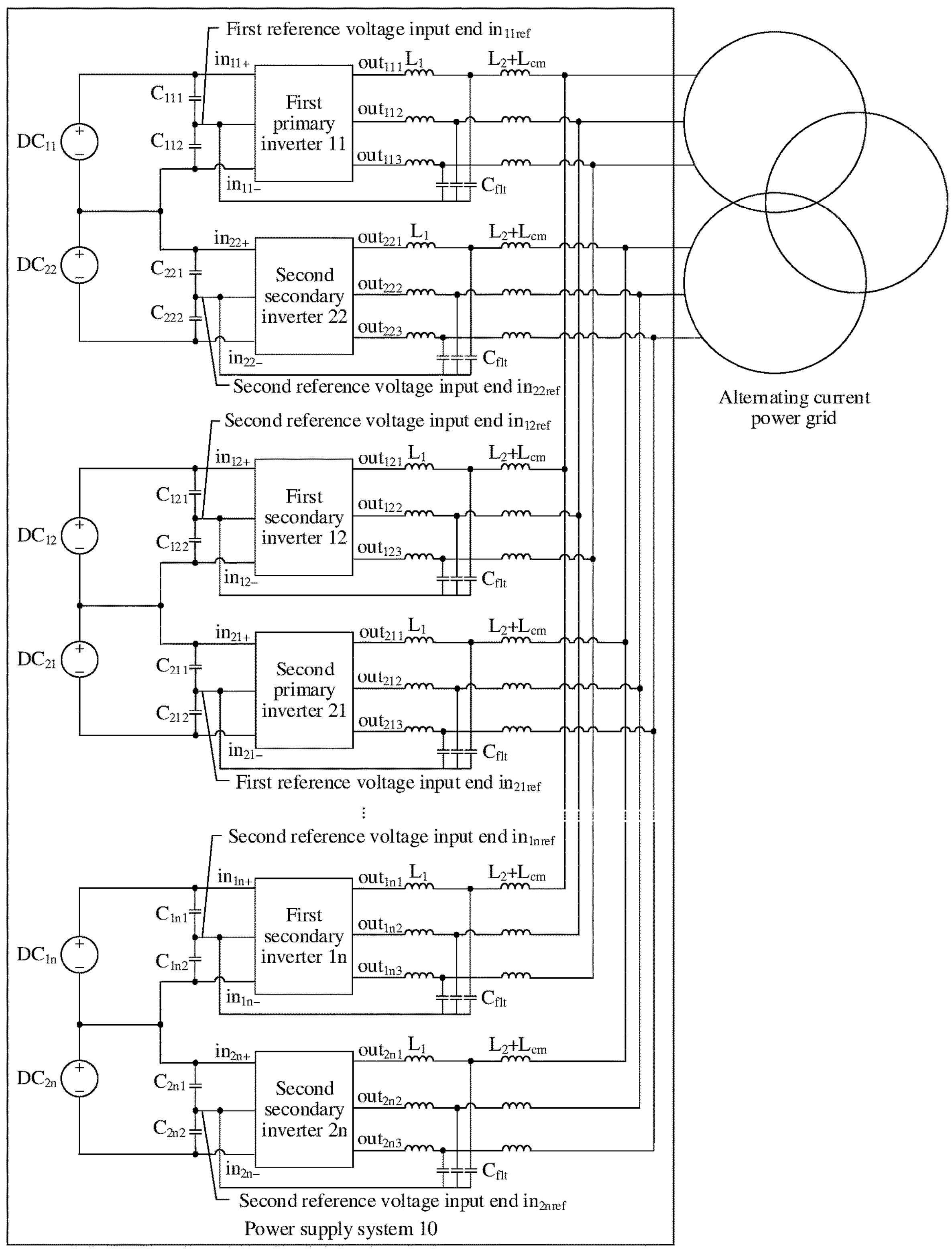
FIG. 5*b* is a schematic diagram of another structure of a power supply system of a bipolar series-parallel combination.

Further, this embodiment is further applicable to the power supply system shown in FIG. 5*b*. As shown in FIG. 5*b*, a negative input end $in_{21-}$ of the first primary inverter 11 is connected to a positive input end $in_{22+}$ of the second secondary inverter 22, a negative input end in 12− of the first secondary inverter 12 is connected to a positive input end $in_{n+}$ of the second primary inverter 21, a negative input end $in_{13-}$ of the first secondary inverter 13 is connected to a positive input end $in_{23+}$ of the second secondary inverter 23, . . . , and a negative input end $in_{1n-}$ of the first secondary inverter 1*n* is connected to a positive input end $in_{2n+}$ of the second secondary inverter 2*n*. A manner for controlling positive and negative bus voltages of inverters in the power supply system 10 shown in FIG. 5*b* is consistent with a manner for controlling positive and negative bus voltages of inverters in the power supply system 10 shown in FIG. 5*a*, and details are not described herein again.

In this embodiment, both the first primary inverter 11 and the second primary inverter 21 may ensure that positive and negative bus voltages thereof are balanced by controlling output common-mode direct current voltages, and each secondary inverter in the first group of inverters and the second group of inverters may ensure that positive and negative bus voltages are balanced by controlling an output common-mode direct current of each secondary inverter, so that the circulating current is stable, and stability of the power supply system 10 is improved. Because no additional device or cable is required, this can reduce costs of the power supply system 10 and has strong applicability.

Based on the power supply system 10 shown in FIG. 5*a* and FIG. 5*b*, the embodiment further provides a method for controlling positive and negative bus voltages of an inverter, including:

adjusting, by a primary inverter, an output common-mode direct current voltage of the primary inverter based on a first voltage difference between a positive bus voltage of the primary inverter and a negative bus voltage of the primary inverter and an output active power of the primary inverter; and adjusting, by a secondary inverter, an output common-mode direct current of the secondary inverter based on a second voltage difference between a positive bus voltage of the secondary inverter and a negative bus voltage of the secondary inverter.

The circulating current may be controlled to ensure that positive and negative bus voltages of inverters in the power supply system are balanced, so that the circulating current is stable, and stability of the power supply system is improved. Because no additional device or cable is required, this can reduce system costs and has strong applicability.

The foregoing descriptions are merely implementations, but are not intended to limit the scope of the embodiments. Any variation or replacement readily figured out by a person skilled in the art shall fall within the scope of the embodiments.

What is claimed is:

1. A power supply system, comprising:

at least one group of inverters, each group of the at least one group of inverters comprises a primary inverter and at least one secondary inverter corresponding to the primary inverter, an input end of the primary inverter is coupled to a direct current power supply corresponding to the primary inverter, an input end of the at least one secondary inverter is coupled to a direct current power supply corresponding to the at least one secondary inverter, and a three-phase output end of the primary inverter is coupled to a three-phase output end of each of the at least one secondary inverter and then is connected to an alternating current power grid, wherein the primary inverter is configured to adjust an output common-mode direct current voltage of the primary inverter based on a first voltage difference between a positive bus voltage of the primary inverter and a negative bus voltage of the primary inverter and an output active power of the primary inverter, wherein the positive bus voltage of the primary inverter is a voltage between a positive input end of the primary inverter and a first reference voltage input end, and the negative bus voltage of the primary inverter is a voltage between the first reference voltage input end and the positive input end of the primary inverter; and the at least one secondary inverter is configured to adjust an output common-mode direct current of the at least one secondary inverter based on a second voltage difference between a positive bus voltage of the at least one secondary inverter and a negative bus voltage of the at least one secondary inverter, wherein the positive bus voltage of the at least one secondary inverter is a voltage between a positive input end of the at least one secondary inverter and a second reference voltage input end, and the negative bus voltage of the at least one secondary inverter is a voltage between the second reference voltage input end and a negative input end of the at least one secondary inverter.

2. The power supply system according to claim 1, wherein the primary inverter is further configured to:

when the first voltage difference is greater than a first preset voltage difference threshold, and the output active power of the primary inverter is greater than 0, increase the output common-mode direct current voltage of the primary inverter, wherein the first preset voltage difference threshold is greater than 0; or when the first voltage difference is less than a second preset voltage difference threshold, and the output active power of the primary inverter is greater than 0, reduce the output common-mode direct current voltage of the primary inverter, wherein the second preset voltage difference threshold is less than 0.

3. The power supply system according to claim 1, wherein the primary inverter is further configured to:

when the first voltage difference is greater than a first preset voltage difference threshold, and the output active power of the primary inverter is less than 0, reduce the output common-mode direct current voltage of the primary inverter, wherein the first preset voltage difference threshold is greater than 0; or when the first voltage difference is less than a second preset voltage difference threshold, and the output active power of the primary inverter is less than 0, increase the output common-mode direct current voltage of the primary inverter, wherein the second preset voltage difference threshold is less than 0.

4. The power supply system according to claim 1, wherein the primary inverter is further configured to:

adjust a direct current voltage in an initial reference output voltage to obtain a target reference output voltage, and adjust the output common-mode direct current voltage of the primary inverter based on the target reference output voltage.

5. The power supply system according to claim 1, wherein the at least one secondary inverter is further configured to:

when the second voltage difference is greater than a first preset voltage difference threshold, reduce the output common-mode direct current of the at least one secondary inverter, wherein the first preset voltage difference threshold is greater than 0; or when the second voltage difference is less than a second preset voltage difference threshold, increase the output common-mode direct current of the at least one secondary inverter, wherein the second preset voltage difference threshold is less than 0.

6. The power supply system according to claim 1, wherein the at least one secondary inverter is further configured to:

adjust a direct current voltage in an initial reference output voltage to obtain a target reference output voltage, and adjust the output common-mode direct current of the at least one secondary inverter based on the target reference output voltage.

7. The power supply system according to claim 1, wherein a negative input end of the primary inverter is connected to the negative input end of the at least one secondary inverter.

8. The power supply system according to claim 1, wherein the positive input end of the primary inverter is connected to the positive input end of the at least one secondary inverter.

9. The power supply system according to claim 1, wherein the at least one group of inverters comprise a first group of inverters and a second group of inverters, a negative input end of one inverter in the first group of inverters is connected to a positive input end of one inverter in the second group of inverters, the first group of inverters comprise a first primary inverter and n first secondary inverters corresponding to the first primary inverter, and the second group of inverters comprise a second primary inverter and n second secondary inverters corresponding to the second primary inverter, wherein n is a positive integer, the three-phase output end of the first primary inverter is coupled to a three-phase output end of each first secondary inverter in the n first secondary inverters and then is connected to the alternating current power grid, and a three-phase output end of the second primary inverter is coupled to a three-phase output end of each second secondary inverter in the n second secondary inverters and then is connected to the alternating current power grid.

10. A method for controlling positive and negative bus voltages of an inverter, wherein the method is applicable to a power supply system, the power supply system comprises at least one group of inverters, each group of the at least one group of inverters comprises a primary inverter and at least one secondary inverter corresponding to the primary inverter, an input end of the primary inverter is coupled to a direct current power supply corresponding to the primary inverter, an input end of the at least one secondary inverter is coupled to a direct current power supply corresponding to the at least one secondary inverter, and a three-phase output end of the primary inverter is coupled to a three-phase output end of each of the at least one secondary inverter and then is connected to an alternating current power grid, the method comprising:

adjusting, by the primary inverter, an output common-mode direct current voltage of the primary inverter based on a first voltage difference between a positive bus voltage of the primary inverter and a negative bus voltage of the primary inverter and an output active power of the primary inverter, wherein the positive bus voltage of the primary inverter is a voltage between a positive input end of the primary inverter and a first reference voltage input end, and the negative bus voltage of the primary inverter is a voltage between the first reference voltage input end and the positive input end of the primary inverter; and adjusting, by the at least one secondary inverter, an output common-mode direct current of the at least one secondary inverter based on a second voltage difference between a positive bus voltage of the at least one secondary inverter and a negative bus voltage of the at least one secondary inverter, wherein the positive bus voltage of the at least one secondary inverter is a voltage between a positive input end of the at least one secondary inverter and a second reference voltage input end, and the negative bus voltage of the at least one secondary inverter is a voltage between the second reference voltage input end and a negative input end of the at least one secondary inverter.

11. The method according to claim 10, wherein the primary inverter adjusting the output common-mode direct current voltage of the primary inverter based on the first voltage difference between the positive bus voltage of the primary inverter and the negative bus voltage of the primary inverter and the output active power of the primary inverter further comprises:

when the first voltage difference is greater than a first preset voltage difference threshold, and the output active power of the primary inverter is greater than 0, increasing, by the primary inverter, the output common-mode direct current voltage of the primary inverter, wherein the first preset voltage difference threshold is greater than 0; or when the first voltage difference is less than a second preset voltage difference threshold, and the output active power of the primary inverter is greater than 0, reducing, by the primary inverter, the output common-mode direct current voltage of the primary inverter, wherein the second preset voltage difference threshold is less than 0.

12. The method according to claim 10, wherein the primary inverter adjusting the output common-mode direct current voltage of the primary inverter based on the first voltage difference between the positive bus voltage of the primary inverter and the negative bus voltage of the primary inverter and the output active power of the primary inverter further comprises:

when the first voltage difference is greater than a first preset voltage difference threshold, and the output active power of the primary inverter is less than 0, reducing, by the primary inverter, the output common-mode direct current voltage of the primary inverter, wherein the first preset voltage difference threshold is greater than 0; or when the first voltage difference is less than a second preset voltage difference threshold, and the output active power of the primary inverter is less than 0, increasing, by the primary inverter, the output common-mode direct current voltage of the primary inverter, wherein the second preset voltage difference threshold is less than 0.

13. The method according to any one of claim 10, wherein adjusting the output common-mode direct current voltage of the primary inverter further comprises:

adjusting, by the primary inverter, a direct current voltage in an initial reference output voltage to obtain a target reference output voltage, and adjusting the output common-mode direct current voltage of the primary inverter based on the target reference output voltage.

14. The method according to claim 10, wherein adjusting the output common-mode direct current of the at least one secondary inverter based on the second voltage difference between the positive bus voltage of the at least one secondary inverter and the negative bus voltage of the at least one secondary inverter further comprises:

when the second voltage difference is greater than a first preset voltage difference threshold, reducing, by the at least one secondary inverter, the output common-mode direct current of the at least one secondary inverter, wherein the first preset voltage difference threshold is greater than 0; or when the second voltage difference is less than a second preset voltage difference threshold, increasing, by the at least one secondary inverter, the output common-mode direct current of the at least one secondary inverter, wherein the second preset voltage difference threshold is less than 0.

15. The method according to claim 10, wherein adjusting the output common-mode direct current of the at least one secondary inverter further comprises:

adjusting, by the at least one secondary inverter, a direct current voltage in an initial reference output voltage to obtain a target reference output voltage; and adjusting the output common-mode direct current of the at least one secondary inverter based on the target reference output voltage.

16. The method according to claim 10, wherein a negative input end of the primary inverter is connected to the negative input end of the at least one secondary inverter.

17. The method according to claim 10, wherein the positive input end of the primary inverter is connected to the positive input end of the at least one secondary inverter.

18. The method according to claim 10, wherein the at least one group of inverters comprise a first group of inverters and a second group of inverters, a negative input end of one inverter in the first group of inverters is connected to a positive input end of one inverter in the second group of inverters, the first group of inverters comprise a first primary inverter and n first secondary inverters corresponding to the first primary inverter, and the second group of inverters comprise a second primary inverter and n second secondary inverters corresponding to the second primary inverter, wherein n is a positive integer, the three-phase output end of the first primary inverter is coupled to a three-phase output end of each first secondary inverter in the n first secondary inverters and then is connected to the alternating current power grid, and a three-phase output end of the second primary inverter is coupled to a three-phase output end of each second secondary inverter in the n second inverters and then is connected to the alternating current power grid.

19. An inverter, wherein an input end of the inverter is coupled to a direct current power supply, and a three-phase output end of the inverter is coupled to a three-phase output end of each of at least one secondary inverter and then is connected to an alternating current power grid, wherein the inverter is configured to adjust an output common-mode direct current voltage of the inverter based on a voltage difference between a positive bus voltage of the inverter and a negative bus voltage of the inverter and an output active power of the inverter, wherein the positive bus voltage of the inverter is a voltage between a positive input end of the inverter and a reference voltage input end, and the negative bus voltage of the inverter is a voltage between the reference voltage input end and the positive input end of the inverter.

20. The inverter according to claim 19, wherein the inverter is further configured to:

when the voltage difference is greater than a first preset voltage difference threshold, and the output active power of the inverter is greater than 0, increase the output common-mode direct current voltage of the inverter, wherein the first preset voltage difference threshold is greater than 0; or when the voltage difference is less than a second preset voltage difference threshold, and the output active power of the inverter is greater than 0, reduce the output common-mode direct current voltage of the inverter, wherein the second preset voltage difference threshold is less than 0.

* * * * *